United States Patent
Li et al.

(10) Patent No.: US 12,368,328 B2
(45) Date of Patent: Jul. 22, 2025

(54) TRANSMIT END SUPPORTING MULTI-DEVICE WIRELESS CHARGING, CHARGING BASE, AND SYSTEM

(71) Applicant: Huawei Digital Power Technologies Co., Ltd., Guangdong (CN)

(72) Inventors: Yuechao Li, Dongguan (CN); Bing Cai, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 147 days.

(21) Appl. No.: 18/193,616

(22) Filed: Mar. 30, 2023

(65) Prior Publication Data

US 2023/0246486 A1 Aug. 3, 2023

Related U.S. Application Data

(63) Continuation of application No. PCT/CN2020/121014, filed on Oct. 15, 2020.

(51) Int. Cl.
*H02J 50/40* (2016.01)
*H02J 50/12* (2016.01)
*H02M 3/155* (2006.01)
*H02M 7/5387* (2007.01)

(52) U.S. Cl.
CPC ............ *H02J 50/402* (2020.01); *H02J 50/12* (2016.02); *H02M 3/155* (2013.01); *H02M 7/5387* (2013.01); *H02J 2207/20* (2020.01)

(58) Field of Classification Search
CPC .......... H02J 50/40; H02J 50/402; H02J 50/10; H02J 50/12; H02M 7/5387; H02M 3/155; H02M 1/007; H02M 1/008
See application file for complete search history.

(56) References Cited

U.S. PATENT DOCUMENTS

| | | | |
|---|---|---|---|
| 2011/0285210 A1* | 11/2011 | Lemmens | H02J 7/007182 |
| | | | 307/104 |
| 2017/0133888 A1 | 5/2017 | Uchida | |
| 2019/0393712 A1* | 12/2019 | Kim | H01F 27/2871 |
| 2020/0119661 A1* | 4/2020 | Hosotani | H02M 1/12 |
| 2022/0216738 A1* | 7/2022 | Yang | H02J 50/12 |

FOREIGN PATENT DOCUMENTS

| | | | |
|---|---|---|---|
| CN | 107834711 A | * | 3/2018 |
| CN | 107959358 A | | 4/2018 |
| CN | 211579639 U | | 9/2020 |
| WO | 2016045212 A1 | | 3/2016 |
| WO | 2019133803 A1 | | 7/2019 |

* cited by examiner

*Primary Examiner* — Rexford N Barnie
*Assistant Examiner* — Rasem Mourad

(57) ABSTRACT

A transmit end for multi-device wireless charging includes N half-bridge inverter circuits, a multi-coil gating matrix, and a multi-coil module. Input terminals of the N half-bridge inverter circuits are connected to corresponding direct currents, and output terminals of the N half-bridge inverter circuits are connected to input terminals of the multi-coil gating matrix. The multi-coil gating matrix includes a plurality of switches configured to respectively connect the output terminals of the N half-bridge inverter circuits to corresponding transmit coils in the multi-coil module.

8 Claims, 18 Drawing Sheets

TRANSMIT END SUPPORTING MULTI-DEVICE WIRELESS CHARGING, CHARGING BASE, AND SYSTEM

CROSS-REFERENCE TO RELATED APPLICATIONS

This application is a continuation of International Application PCT/CN2020/121014, filed on Oct. 15, 2020, the disclosure of which is hereby incorporated by reference in its entirety.

TECHNICAL FIELD

This application relates to the field of electronic device technologies, and in particular, to a transmit end supporting multi-device wireless charging, a charging base, and a system.

BACKGROUND

Currently, an increasing quantity of mobile terminals, such as mobile phones, tablet computers, and wearable devices, support wireless charging. The wearable devices include a watch, a Bluetooth headset, and the like.

One family or one user may own a plurality of mobile terminals, such as a mobile phone, a watch, and a Bluetooth headset. When all the plurality of mobile terminals need to be charged, a transmit end for wireless charging is expected to be able to simultaneously charge the plurality of mobile terminals, for example, simultaneously charge the mobile phone and the Bluetooth headset. Usually, the Bluetooth headset is equipped with a corresponding headset compartment. For a transmit end that supports simultaneous wireless charging for a plurality of devices, the charging compartment of the Bluetooth headset and the mobile phone may be simultaneously placed on the transmit end for wireless charging. The transmit end wirelessly charges the headset compartment, and then the headset compartment charges the Bluetooth headset.

In the conventional technology, in a one-to-many transmit end supported by the widely used Qi protocol for wireless charging, a design of each charging architecture is quite complex. Each charging architecture includes a closed-loop boost/buck circuit, a full-bridge inverter circuit, and a multi-coil gating matrix. Because the transmit end needs to charge N mobile terminals, correspondingly N charging architectures are required. Consequently, the transmit end includes many electrical elements, leading to complex control, high costs, and difficult productization.

SUMMARY

This application provides a transmit end supporting multi-device wireless charging, a charging base, and a system, to reduce a quantity of electrical elements, reduce a size of a circuit board, reduce control difficulty, and provide ease of implementation.

An embodiment of this application provides a transmit end supporting multi-device wireless charging. The transmit end can simultaneously support N-channel wireless charging, or may wirelessly charge fewer than N devices. A charged device may be a mobile phone, a wearable device, a tablet computer, or the like. N is an integer greater than or equal to 2. The transmit end includes N half-bridge inverter circuits, a multi-coil gating matrix, and a multi-coil module. Input terminals of the N half-bridge inverter circuits are connected to corresponding direct currents, and output terminals of the N half-bridge inverter circuits are connected to input terminals of the multi-coil gating matrix. The multi-coil gating matrix includes a plurality of switching switches, configured to respectively connect the output terminals of the N half-bridge inverter circuits to corresponding transmit coils in the multi-coil module.

Compared with a full-bridge inverter circuit, in the half-bridge inverter circuit, a quantity of bridge arms is reduced by 1, and a quantity of switching transistors may be reduced by half. In addition, when the half-bridge inverter circuit is used, a quantity of switching transistors in a next-stage gating matrix may also be reduced by half correspondingly. Therefore, compared with the conventional technology, in the transmit end provided in this embodiment of this application, a quantity of switching transistors may be reduced by half. When the quantity of switching transistors is reduced, a quantity of corresponding control signals is also reduced. Therefore, both hardware control and software control are simplified. In the transmit end provided in this embodiment, a quantity of hardware can be reduced, so that a size of a circuit board can be reduced. Because the quantity of switching transistors is reduced, the quantity of control signals may be reduced, thereby improving control reliability.

Each half-bridge inverter circuit includes a bridge arm, and the bridge arm includes two controllable switching transistors connected in series. The two controllable switching transistors connected in series are a first switching transistor and a second switching transistor. A first terminal of the first switching transistor is connected to a positive electrode of the direct current. A second terminal of the first switching transistor is connected to a first terminal of the second switching transistor. A second terminal of the second switching transistor is connected to a negative electrode of the direct current. The second terminal of the first switching transistor serves as an output terminal of the half-bridge inverter circuit and is connected to the input terminal of the multi-coil gating matrix. A quantity of switching transistors in each half-bridge inverter circuit is half of that in a full-bridge inverter circuit. In addition, a quantity of switches in a corresponding multi-coil gating matrix is also half of that in a multi-coil gating matrix corresponding to the full-bridge inverter circuit. Therefore, in the transmit end, a quantity of switching transistors can be greatly reduced. A smaller quantity of switching transistors indicates a smaller quantity of corresponding control signals, simpler circuit board wiring, and easier control.

Preferably, the transmit end provided in this embodiment of this application may further include a direct current/direct current DC/DC conversion module. Because an open-loop DC/DC circuit does not need to perform closed-loop control, to improve charging efficiency, the direct current/direct current conversion module includes at least an open-loop direct current/direct current circuit. The direct current/direct current conversion module converts an output voltage of the adapter and then output N direct currents. The input terminals of the N half-bridge inverter circuits are respectively connected to the N direct currents.

In the transmit end provided in this embodiment of this application, one input terminal, instead of N input terminals, of the DC/DC conversion module is connected to the adapter. The N half-bridge circuits may share one open-loop DC/DC circuit, thereby reducing circuit complexity, and reducing a size of a circuit board.

Preferably, to adapt to different adapters, the direct current/direct current conversion module of the transmit end may further include N first closed-loop direct current/direct current circuits with a function of accurately adjusting an output voltage and an output current. An input terminal of the open-loop direct current/direct current circuit is connected to an output terminal of the adapter. An input terminal of each first closed-loop direct current/direct current circuit is connected to an output terminal of the open-loop direct current/direct current circuit. An output terminal of each first closed-loop direct current/direct current circuit is connected to an input terminal of a corresponding half-bridge inverter circuit. Because the closed-loop direct current/direct current circuit can implement closed-loop control, an input voltage and an input current that are required at the input terminal of the half-bridge inverter circuit can be accurately adjusted.

Preferably, a specific implementation of the open-loop direct current/direct current DC/DC circuit is not specifically limited in this embodiment of this application. For example, the open-loop direct current/direct current circuit may be an open-loop buck circuit, or may be an open-loop boost circuit. Because electric energy conversion efficiency of the open-loop DC/DC circuit is higher than that of the closed-loop DC/DC circuit, efficiency of the DC/DC conversion module in this embodiment of this application is higher than that of a conventional closed-loop DC/DC circuit such as a buck/boost circuit. Therefore, in the transmit end provided in this embodiment of this application, wireless charging efficiency can be improved.

Preferably, a specific implementation of the first closed-loop direct current/direct current circuit is not specifically limited in this embodiment of this application either. For example, the first closed-loop direct current/direct current circuit may be a first closed-loop boost circuit, or may be a first closed-loop buck circuit.

Specifically, the open-loop boost/buck circuit may include a switched-capacitor SC circuit, and the first closed-loop buck circuit includes a buck circuit. A voltage conversion ratio is not specifically limited in this embodiment either. For example, when the SC circuit is an SC boost circuit, the voltage conversion ratio may be 1:2, 1:3, 1:4, 1:5, or the like, that is, 2× boost, 3× boost, 4× boost, or 5× boost is performed. A specific voltage conversion ratio may be set according to an actual requirement.

In addition, the transmit end may further include a controller. When the output voltage of the adapter is less than a preset voltage, the controller controls the switched-capacitor circuit to operate in a boost state, and controls the buck circuit to operate in a buck state. That is, when the output voltage of the adapter is low, a subsequent input requirement of the half-bridge inverter circuit cannot be met. The output voltage of the adapter is boosted by using the switched-capacitor circuit, and then is bucked by using the buck circuit. It should be noted that the boost performed by the switched-capacitor circuit accounts for a largest proportion of boost, that is, a boost ratio is mainly implemented by the switched-capacitor circuit. However, the buck performed by the buck circuit is only buck within a small range. This may be understood as that a main function of the buck circuit is voltage regulation.

Implementations of the transmit end provided in this embodiment of this application are separately described below with reference to a case that the adapter has a level-based voltage adjustment function and a case that the adapter has a continuous voltage adjustment function. When the adapter has the level-based voltage adjustment function, a requirement for the transmit end is low, and the transmit end may not greatly adjust the output voltage of the adapter; instead, the adapter adjusts the output voltage of the adapter to meet a charging requirement. Preferably, when the output voltage of the adapter is adjustable by level, the controller controls the switched-capacitor circuit to operate in a straight-through state, that is, the switched-capacitor circuit responsible for large-range adjustment operates in a straight-through state, without boost or buck; and controls the buck circuit to operate in a buck state. In this case, the buck circuit performs small-range buck, and performs a main function of voltage regulation, to meet a charging requirement of a next-stage circuit.

However, when the adapter has the continuous voltage adjustment function, the adapter has a more powerful function, and the transmit end almost does not need to adjust a voltage, and only needs to operate in a straight-through state. Preferably, when the output voltage of the adapter is continuously adjustable, the controller controls the switched-capacitor circuit to operate in a straight-through state, and controls the buck circuit to operate in a straight-through state.

Preferably, the direct current/direct current conversion module described above includes two stages of power conversion circuits. It may be understood that the direct current/direct current conversion module may include three stages of power conversion circuits, that is, the direct current/direct current conversion module further includes a second closed-loop direct current/direct current circuit. The input terminal of the open-loop direct current/direct current circuit is connected to the output terminal of the adapter through the second closed-loop direct current/direct current circuit. When the open-loop direct current/direct current circuit is an open-loop boost circuit, the second closed-loop direct current circuit is a closed-loop boost circuit. When the open-loop direct current/direct current circuit is an open-loop buck circuit, the second closed-loop direct current/direct current circuit is a closed-loop buck circuit. When the second closed-loop direct current/direct current circuit is a closed-loop boost circuit, the second closed-loop direct current/direct current circuit includes a boost circuit. Although the DC/DC conversion module includes three stages of DC/DC conversion circuits, only a closed-loop DC/DC conversion circuit at the last stage includes N channels, and DC/DC conversion circuits at the first two stages each include only one channel. This can simplify a circuit structure, reduce a quantity of electrical elements, reduce a size of a circuit, reduce costs, reduce power consumption, and facilitate heat dissipation.

The DC/DC conversion module provided in this embodiment includes three stages of DC/DC conversion circuits: a closed-loop DC/DC circuit at a first stage, an open-loop DC/DC circuit at a second stage, and a closed-loop DC/DC circuit at a third stage. The closed-loop DC/DC circuit at the first stage may be a closed-loop boost circuit, the open-loop DC/DC circuit at the second stage may be an open-loop boost circuit, and the first closed-loop DC/DC circuit at the third stage may be a closed-loop buck circuit. That is, the circuits at the first two stages are boost circuits, and the circuit at the last stage is a buck circuit. In addition, based on a specific application scenario, alternatively, the closed-loop DC/DC circuit at the first stage may be a buck circuit, the open-loop DC/DC circuit at the second stage may be a buck circuit, and the closed-loop DC/DC circuit at the third stage may be a boost circuit. That is, the circuits at the first two stages are buck circuits, and the circuit at the last stage is a boost circuit. The three stages of DC/DC circuits are not specifically limited in this embodiment of this application. The three stages of DC/DC circuits may be any combination of a boost circuit and a buck circuit. In the three-stage DC/DC conversion module provided in this embodiment, a boost ratio of the SC circuit is fixed. Therefore, in a case that a voltage-adjustable boost circuit is added, boost adjustment can be more flexible, and controllability of an output voltage is improved, to adapt to different types of loads and improve universality of the transmit end.

Preferably, the transmit end further includes a controller. When the output voltage of the adapter is less than a first preset voltage, the controller controls the boost circuit to operate in a boost state, controls the switched-capacitor circuit to operate in a boost state, and controls the buck to operate in a straight-through state.

Preferably, the controller is further configured to: when the output voltage of the adapter is adjustable by level and the output voltage of the adapter is less than a second preset voltage, control the boost circuit to operate in a straight-through state, control the switched-capacitor circuit to operate in a boost state, and control the buck circuit to operate in a buck state, where the second preset voltage is greater than the first preset voltage.

Preferably, the controller is further configured to: when the output voltage of the adapter is adjustable by level and the output voltage of the adapter is greater than a second preset voltage, control the boost circuit to operate in a straight-through state, control the switched-capacitor circuit to operate in a straight-through state, and control the buck circuit to operate in a buck state, where the second preset voltage is greater than the first preset voltage.

Preferably, the controller is further configured to: when the output voltage of the adapter is continuously adjustable, control the boost circuit to operate in a straight-through state, control the switched-capacitor circuit to operate in a straight-through state, and control the buck circuit to operate in a straight-through state.

Boost of the transmit end is mainly implemented by the SC circuit, and operation efficiency of the SC circuit is much higher than that of the boost circuit and the buck circuit. Therefore, with the transmit end, charging efficiency can be improved.

Preferably, some of the N first closed-loop direct current/direct current circuits are first closed-loop buck circuits, and some are first closed-loop boost circuits.

Preferably, the input terminal of the first closed-loop direct current/direct current circuit is further connected to an output terminal of the second closed-loop direct current/direct current and/or the output terminal of the adapter.

An embodiment of this application further provides a charging base, configured to support wireless charging for N electronic devices, where N is an integer greater than or equal to 2. The charging base includes a power interface, N half-bridge inverter circuits, a multi-coil gating matrix, a multi-coil module, and a transmit coil tray. The power interface is configured to connect to a power output terminal of an adapter. The transmit coil tray is configured to hold the multi-coil module. Input terminals of the N half-bridge inverter circuits are connected to corresponding direct currents, and output terminals of the N half-bridge inverter circuits are connected to input terminals of the multi-coil gating matrix. The multi-coil gating matrix includes a plurality of switching switches, configured to respectively connect the output terminals of the N half-bridge inverter circuits to corresponding transmit coils in the multi-coil module.

Each half-bridge inverter circuit includes a bridge arm, and the bridge arm includes two controllable switching transistors connected in series. The two controllable switching transistors connected in series are a first switching transistor and a second switching transistor. A first terminal of the first switching transistor is connected to a positive electrode of the direct current. A second terminal of the first switching transistor is connected to a first terminal of the second switching transistor. A second terminal of the second switching transistor is connected to a negative electrode of the direct current. The second terminal of the first switching transistor serves as an output terminal of the half-bridge inverter circuit and is connected to the input terminal of the multi-coil gating matrix.

Compared with a full-bridge inverter circuit, in the half-bridge inverter circuit, a quantity of bridge arms is reduced by 1, and a quantity of switching transistors may be reduced by half. In addition, when the half-bridge inverter circuit is used, a quantity of switching transistors in a next-stage gating matrix may also be reduced by half correspondingly. Therefore, compared with the conventional technology, a quantity of switching transistors in the transmit end provided in this embodiment of this application can be reduced by half. When the quantity of switching transistors is reduced, a quantity of corresponding control signals is also reduced. Therefore, both hardware control and software control are simplified. In the charging base provided in this embodiment, a quantity of hardware can be reduced, thereby reducing a size of a circuit board, and reducing costs of the charging base. Because the quantity of switching transistors is reduced, the quantity of control signals may be reduced, thereby improving control reliability.

Preferably, the charging base further includes a direct current/direct current conversion module. The direct current/direct current conversion module is configured to convert an output voltage of an adapter and then output N direct currents. The direct current/direct current conversion module includes at least an open-loop direct current/direct current circuit. The input terminals of the N half-bridge inverter circuits are respectively connected to the N direct currents.

Preferably, the direct current/direct current conversion module includes a switched-capacitor boost circuit and N buck circuits. An input terminal of the SC boost circuit is connected to an output terminal of the adapter. Input terminals of the N buck circuits are all connected to an output terminal of the switched-capacitor boost circuit. An output terminal of each buck circuit is connected to an input terminal of a corresponding half-bridge inverter circuit. The switched-capacitor boost circuit operates in a boost state or a straight-through state, and the buck circuit operates in a buck state or a straight-through state.

Preferably, the direct current/direct current conversion module includes a boost circuit, a switched-capacitor boost circuit, and N buck circuits. An input terminal of the boost circuit is connected to an output terminal of the adapter. An input terminal of the SC boost circuit is connected to an output terminal of the boost circuit. Input terminals of the N buck circuits are all connected to an output terminal of the switched-capacitor boost circuit. An output terminal of each buck circuit is connected to an input terminal of a corresponding half-bridge inverter circuit. The boost circuit operates in a boost state or a straight-through state, the switched-capacitor boost circuit operates in a boost state or a straight-through state, and the buck circuit operates in a buck state or a straight-through state.

Based on the transmit end provided in the foregoing embodiment, an embodiment of this application further provides a wireless charging system, including the transmit end described above, and further including at least one electronic device. The transmit end is configured to wirelessly charge the at least one electronic device.

The wireless charging system can simultaneously wirelessly charge the N electronic devices. Because a circuit structure of the transmit end included in the wireless charging system is simpler, a size of the transmit end can be reduced, and reliability of wireless charging performed by the transmit end can be improved. In addition, charging efficiency can be improved.

It can be learned from the foregoing technical solutions that embodiments of this application have the following advantages:

The transmit end for wireless charging supports N-channel wireless charging, and includes N half-bridge inverter circuits, a multi-coil gating matrix, and a multi-coil module. Input terminals of the N half-bridge inverter circuits are connected to corresponding direct currents, and output terminals of the N half-bridge inverter circuits are connected to input terminals of the multi-coil gating matrix. The multi-coil gating matrix includes a plurality of switching switches, configured to respectively connect the output terminals of the N half-bridge inverter circuits to corresponding transmit coils in the multi-coil module.

An inverter circuit in the transmit end is a half-bridge inverter circuit. Compared with a full-bridge inverter circuit, a quantity of bridge arms in each inverter circuit is reduced by 1, that is, a quantity of switching transistors is reduced by 2. In the case of N charging circuits, a quantity of switching transistors in N inverter circuits may be reduced by 2N. In addition, when the half-bridge inverter circuit is used, a quantity of switching transistors in a next-stage gating matrix may also be reduced by half correspondingly. Therefore, compared with the conventional technology, in the transmit end provided in embodiments of this application, a quantity of switching transistors may be reduced by half. When the quantity of switching transistors is reduced, a quantity of corresponding control signals is also reduced. Therefore, both hardware control and software control are simplified. In the transmit end provided in this embodiment, a quantity of hardware can be reduced, so that a size of a circuit board can be reduced. Because the quantity of switching transistors is reduced, the quantity of control signals may be reduced, thereby improving control reliability.

DESCRIPTION OF EMBODIMENTS

The following describes technical solutions in embodiments of this application with reference to accompanying drawings in embodiments of this application. The described embodiments are merely some but not all of embodiments of this application.

The following descriptions, terms such as "first" and "second" are merely intended for a purpose of description, and shall not be understood as an indication or implication of relative importance or an implicit indication of a quantity of indicated technical features. Therefore, a feature limited by "first", "second", or the like may explicitly or implicitly include one or more features. In the descriptions of this application, unless otherwise stated, "a plurality of" means two or more than two.

In addition, in this application, orientation terms such as "up" and "down" may include but are not limited to being defined relative to placement orientations of components shown in the accompanying drawings. It should be understood that these directional terms may be relative concepts and are used for relative description and clarification, and may vary correspondingly based on changes of the placement orientations of the components in the accompanying drawings.

In this application, it should be noted that a term "connection" should be understood in a broad sense unless otherwise expressly specified and limited. For example, the "connection" may be a fixed connection, or may be a detachable connection or an integrated connection; and may be a direct connection, or may be an indirect connection through an intermediate medium. In addition, a term "coupling" may be a manner of implementing an electrical connection for signal transmission. The "coupling" may be a direct electrical connection, or may be an indirect electrical connection through an intermediate medium.

To enable persons skilled in the art to better understand technical solutions provided in embodiments of this application, an operation principle of a transmit end for one-to-many wireless charging is described below.

An application scenario of technical solutions provided in this application is that a transmit end for wireless charging can support multi-channel wireless charging, for example, N-channel wireless charging, where N is an integer greater than or equal to 2, for example, N is 3; and may simultaneously wirelessly charge three different or same electronic devices. When three different electronic devices are charged, for example, a mobile phone, a watch, and a headset may be simultaneously wirelessly charged. When a quantity of charged electronic devices is less than 3, an idle charging circuit is not in use and does not output power.

Figure 1:
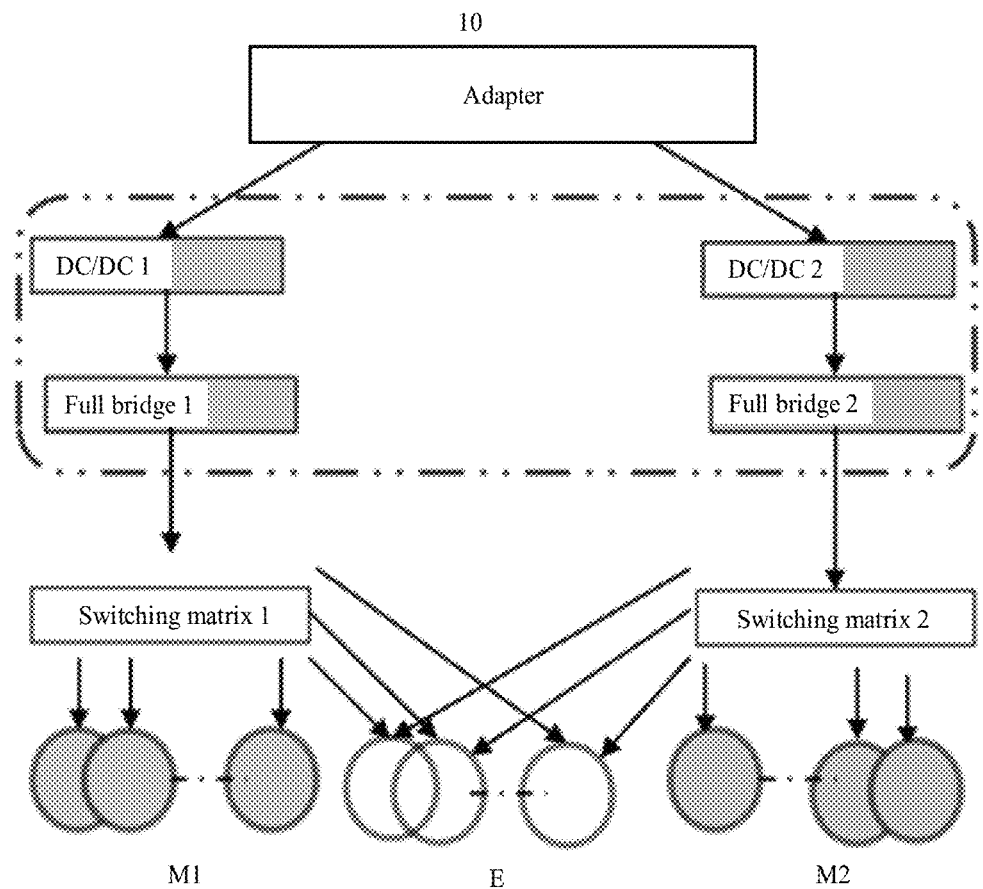
FIG. 1 is a schematic diagram of a transmit end for one-to-two wireless charging.

FIG. 1 is a schematic diagram of a transmit end for one-to-two wireless charging.

Currently, the Qi protocol is widely used for wireless charging for an electronic device. The current Qi protocol stipulates that a full-bridge inverter circuit is used to invert a direct current into an alternating current, and the alternating current is provided for a gating matrix.

Two charging circuits provided in FIG. 1 are used as an example below for description, that is, N=2.

The transmit end for wireless charging includes a direct current/direct current DC/DC conversion circuit 1, a DC/DC 2, a full bridge 1, a full bridge 2, a gating matrix 1, a gating matrix 2, and a multi-module coil. The multi-module coil includes a coil M1, a coil M2, and a coil E. The multi-coil module is a transmit coil included in the transmit end, and is configured to transmit an alternating electromagnetic field. A receive coil is disposed in a charged electronic device. An electromagnetic field of the receive coil is coupled to an electromagnetic field the transmit coil to perform wireless charging.

An input terminal of the DC/DC 1 is connected to an output terminal of an adapter 10, and an input terminal of the DC/DC 2 is connected to the output terminal of the adapter 10.

An output terminal of the DC/DC 1 is connected to an input terminal of the full bridge 1, and an output terminal of the DC/DC 2 is connected to an input terminal of the full bridge 2.

Figure 2:
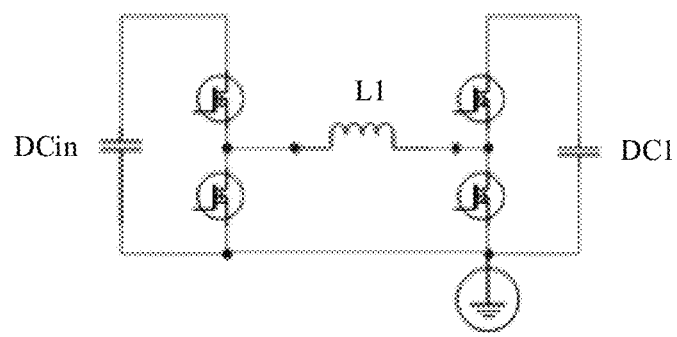
FIG. 2 is a schematic diagram of a buck/boost circuit.

Both the DC/DC 1 and the DC/DC 2 are buck/boost circuits. FIG. 2 is a schematic diagram of a buck/boost circuit in the conventional technology.

It can be learned from FIG. 2 that each buck/boost circuit includes four switching transistors. DCin is a power supply connected to an input terminal of the buck/boost circuit, and DC1 is an output power supply. L1 is a main power inductor of the buck/boost circuit.

Figure 3:
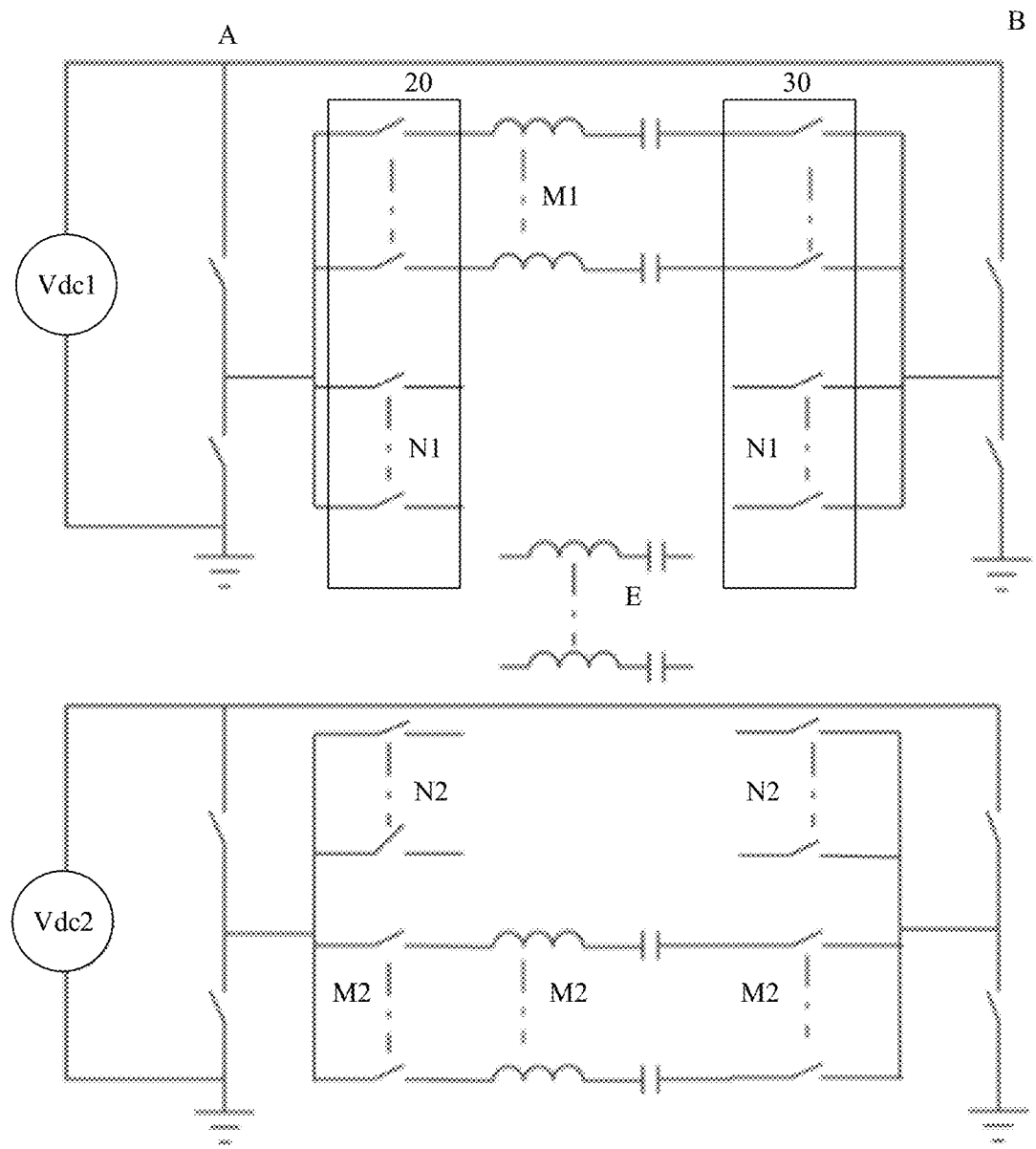
FIG. 3 is a schematic diagram of a full-bridge inverter circuit, a gating matrix, and a multi-module coil.

Both the full bridge 1 and the full bridge 2 are full-bridge inverter circuits. For details, refer to FIG. 3. FIG. 3 is a schematic diagram of a full-bridge inverter circuit, a gating matrix, and a multi-module coil provided in the conventional technology.

It can be learned from FIG. 3 that the full bridge 1 is used as an example, and an input terminal is connected to Vdc1, namely, the DC1 in FIG. 2. Each full-bridge inverter circuit includes two bridge arms: a first bridge arm A and a second bridge arm B. The first bridge arm A includes two switching transistors, and the second bridge arm B includes two switching transistors. Therefore, each full-bridge inverter circuit includes four switching transistors.

If N charging circuits are included, the buck/boost circuit includes four switching transistors, and the full-bridge inverter circuit includes four switching transistors. In this case, 8N (4N+4N) switching transistors are required.

In addition, when the full-bridge inverter circuit includes two bridge arms, a quantity of switches in the gating matrix also needs to be multiplied, because the switches in the gating matrix need to respectively switch connection relationships between the multi-coil module and the two bridge arms. As shown in the figure, the bridge arm A corresponds to a first group of switches 20 in the gating matrix, and the bridge arm B corresponds to a second group of switches 30 in the gating matrix. The first group of switches 20 includes a switch N1, and the second group of switches 30 also includes a switch N1.

The multi-coil module is divided into three groups based on physical locations: a coil M1, a coil M2, and a coil E. The M1 and the M2 are connected only to the full bridge 1, and the E, as a shared coil, may be connected to the full bridge 1 or the full bridge 2.

The M1 and the M2 are connected only to the first bridge arm A and the second bridge arm B respectively. When the shared coil E is connected to the full bridge 1, a first terminal of the shared coil E may be connected to the first bridge arm A through the N1 in the first group of switches 20, and a second terminal of the shared coil E is connected to the second bridge arm B through the N1 in the second group of switches 30. In addition, the shared coil E may alternatively be connected to the full bridge 2 through N2. Details are not described herein.

The shared coil E needs to be connected to two full-bridge inverter circuits. A resonant loop formed by connecting each coil and a capacitor in series requires at least four switching transistors, to support complete connection to or disconnection from two bridge arms in each full-bridge inverter circuit. A large quantity of switching transistors and a large quantity of drive signals for the switching transistors are required.

An inverter circuit in a conventional transmit end for multi-channel wireless charging is a full-bridge inverter circuit. The full-bridge inverter circuit and a next-stage multi-coil gating matrix are quite complex. Consequently, there are many switching transistors and control signals. In addition, as a quantity of charging channels increases, a quantity of switching transistors needs to be multiplied.

Based on the disadvantages of the foregoing technical solution, an inverter circuit in a transmit end supporting multi-device wireless charging in embodiments of this application uses a half-bridge topology. Compared with a full-bridge inverter circuit, in the half-bridge inverter circuit, a quantity of bridge arms is reduced by 1, and a quantity of switching transistors may be reduced by half. In addition, when the half-bridge inverter circuit is used, a quantity of switching transistors in a next-stage gating matrix may also be reduced by half correspondingly. Therefore, compared with the conventional technology, in the transmit end provided in this embodiment of this application, a quantity of switching transistors may be reduced by half. When the quantity of switching transistors is reduced, a quantity of corresponding control signals is also reduced. Therefore, both hardware control and software control are simplified. In the transmit end provided in this embodiment, a quantity of hardware can be reduced, so that a size of a circuit board can be reduced. Because the quantity of switching transistors is reduced, the quantity of control signals may be reduced, thereby improving control reliability.

Technical solutions provided in embodiments of this application are described in detail below with reference to accompanying drawings.

Transmit End Embodiment 1

Figure 4:
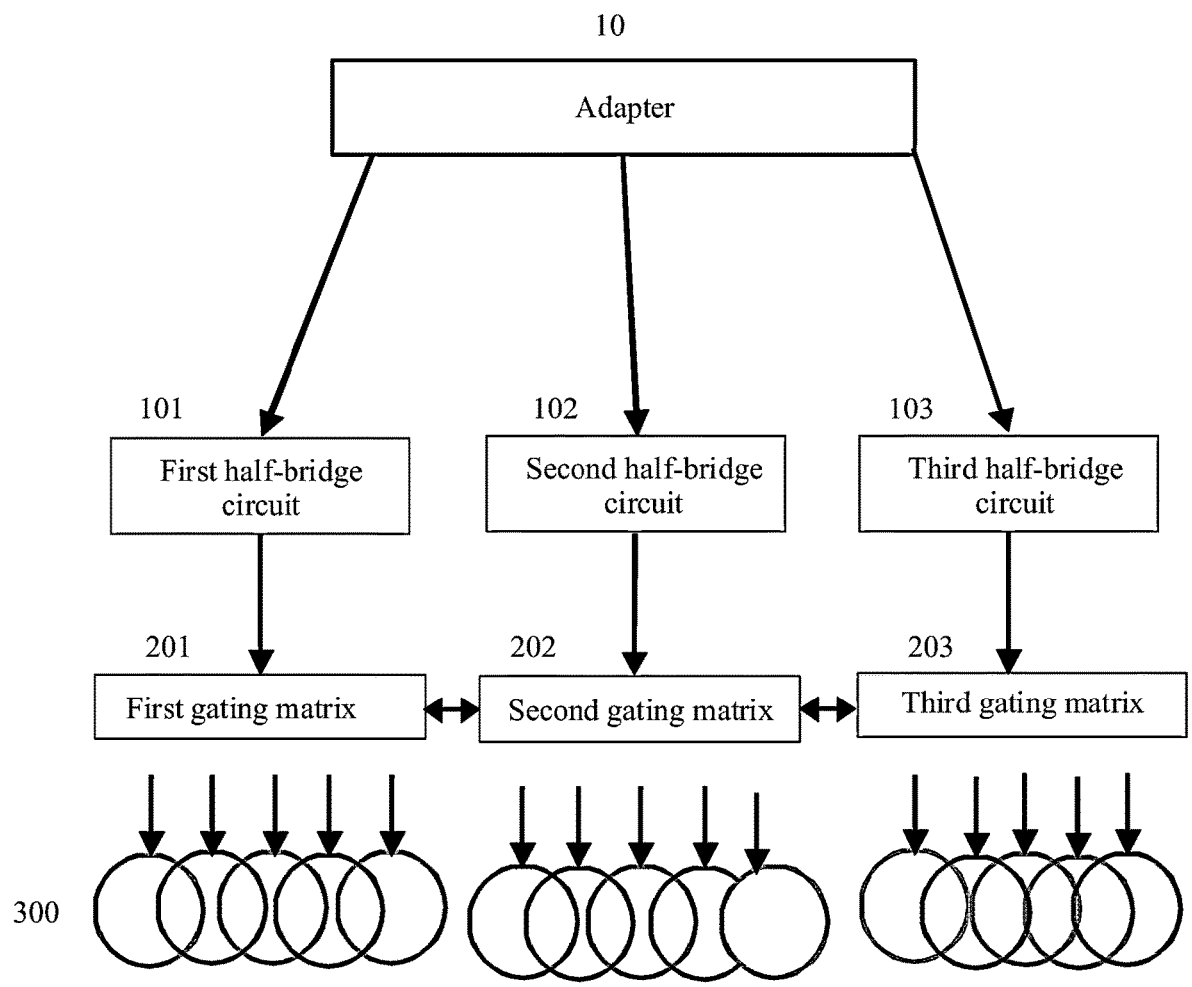
FIG. 4 is a schematic diagram of a transmit end according to an embodiment of this application.

FIG. 4 is a schematic diagram of a transmit end according to an embodiment of this application.

The transmit end supporting multi-device wireless charging in this embodiment of this application is configured to support N-channel wireless charging, where N is an integer greater than or equal to 2; and includes a multi-coil gating matrix, N half-bridge inverter circuits, and a multi-coil module 300.

Input terminals of the N half-bridge inverter circuits are connected to corresponding direct currents. The direct currents may be direct currents output by an adapter 10, or may be direct currents obtained by further converting, by using a DC/DC conversion module, direct currents output by the adapter 10. This is not specifically limited in this embodiment. For example, the DC/DC conversion module may perform boost conversion, buck conversion, or a combination of boost conversion and buck conversion. This is not limited in this embodiment.

If an output voltage of the adapter 10 can meet a subsequent load requirement, the adapter 10 may directly provide the output voltage for the N half-bridge inverter circuits without processing by the DC/DC conversion module. In the following embodiments, for ease of description, the half-bridge inverter circuit is referred to as a half-bridge circuit for short.

Output terminals of the N half-bridge inverter circuits are connected to an input terminal of the multi-coil gating matrix. As shown in FIG. 4, that N is 3 is used as an example for description. A specific value of N is not specifically limited in this embodiment of this application. Alternatively, N may be 2 or another integer greater than 3. The N half-bridge inverter circuits are a first half-bridge circuit 101, a second half-bridge circuit 102, and a third half-bridge circuit 103.

The multi-coil gating matrix includes a plurality of switching switches, configured to respectively connect the output terminals of the N half-bridge inverter circuits to corresponding transmit coils in the multi-coil module. As shown in FIG. 4, when N is 3, the multi-coil gating matrix includes a first gating matrix 201, a second gating matrix 202, and a third gating matrix 203.

In the transmit end provided in this embodiment, an inverter circuit is a half-bridge inverter circuit. Compared with a full-bridge inverter circuit, a quantity of bridge arms is reduced by 1. To be specific, the full-bridge inverter circuit includes two bridge arms, and each bridge arm includes at least two controllable switching transistors. However, the half-bridge inverter circuit includes one bridge arm, and each bridge arm includes two controllable switching transistors. That is, compared with one full-bridge inverter circuit, a quantity of controllable switching transistors in each half-bridge circuit is reduced by at least 2. In the case of N charging circuits, a quantity of switching transistors in N inverter circuits may be reduced by 2N. In addition, a quantity of switching transistors in a next-stage gating matrix connected to the inverter circuit may also be reduced correspondingly. Correspondingly, a quantity of control signals can be reduced, and a smaller quantity of control signals contributes to higher operation reliability. The technical solution provided in this embodiment is of great significance to a one-to-many wireless charging scenario. A circuit structure is simplified, and circuit control is also simplified. In the transmit end provided in this technical solution, a quantity of switching transistors can be reduced, that is, a quantity of electrical elements is reduced. Correspondingly, a size of a circuit board can be reduced, thereby facilitating miniaturization of a transmit end.

Figure 5:
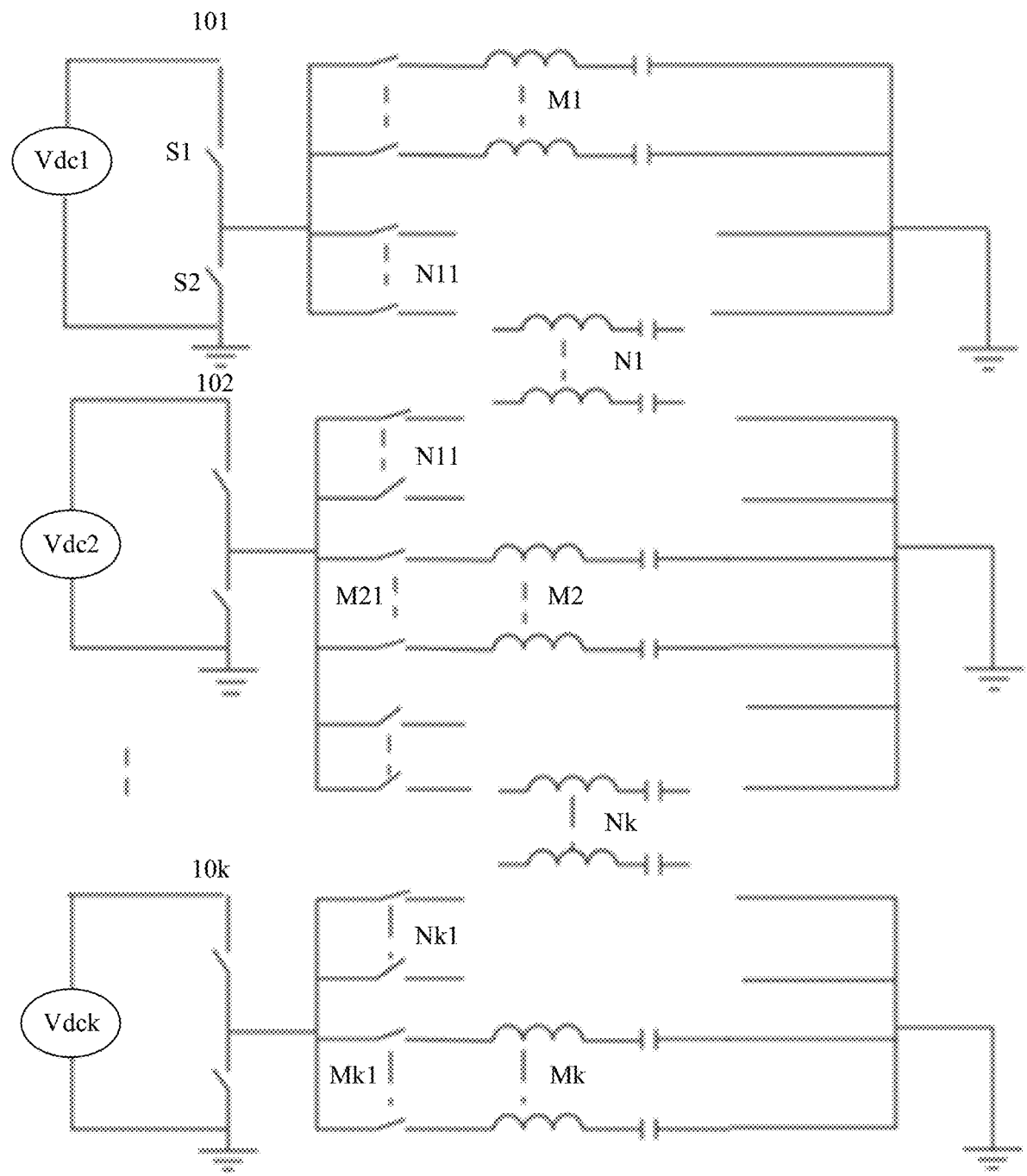
FIG. 5 is a schematic diagram of a half-bridge inverter circuit and a multi-coil gating matrix according to an embodiment of this application.

FIG. 5 is a schematic diagram of a half-bridge inverter circuit and a multi-coil gating matrix according to an embodiment of this application.

In FIG. 5, that the transmit end includes k charging circuits is used as an example for description, where k is an integer greater than or equal to 2. The k charging circuits correspond to k half-bridge inverter circuits: a first half-bridge inverter circuit 101, a second half-bridge inverter circuit 102, and a kth half-bridge inverter circuit 10k. An input terminal of each half-bridge inverter circuit is connected to a corresponding direct current. To be specific, an input terminal of the first half-bridge inverter circuit 101 is connected to a corresponding direct current Vdc1, an input terminal of the second half-bridge inverter circuit 102 is connected to a corresponding direct current Vdc2, and an input terminal of the kth half-bridge inverter circuit 10k is connected to a corresponding direct current Vdck.

Each half-bridge inverter circuit includes a bridge arm, and the bridge arm includes two controllable switching transistors connected in series. A specific implementation of the controllable switching transistor is not specifically limited in this embodiment of this application. For example, the controllable switching transistor may be a MOS transistor or a gallium nitride semiconductor device.

Two controllable switching transistors that are connected in series and that are included in each half-bridge inverter circuit are a first switching transistor and a second switching transistor.

A first terminal of the first switching transistor is connected to a positive electrode of the direct current. A second terminal of the first switching transistor is connected to a first terminal of the second switching transistor. A second terminal of the second switching transistor is connected to a negative electrode of the direct current. The second terminal of the first switching transistor serves as an output terminal of the half-bridge inverter circuit and is connected to an input terminal of the multi-coil gating matrix. For ease of description, the controllable switching transistor is referred to as a switching transistor for short below for description.

As shown in FIG. 5, the first half-bridge circuit is used as an example, and the first half-bridge circuit includes two switching transistors: a first switching transistor S1 and a second switching transistor S2. A first terminal of the S1 is connected to a positive electrode of the corresponding direct current Vdc1, a second terminal of the S1 is connected to a first terminal of the S2, and a second terminal of the S2 is connected to a negative electrode of the Vdc1. The second terminal of the S1 serves as an output terminal of the half-bridge circuit and is connected to the input terminal of a corresponding multi-coil gating matrix.

A coil module M1 is a coil module corresponding to the first half bridge 101, a coil module M2 is a coil module corresponding to the second half-bridge circuit 102, and a coil module Mk is a coil module corresponding to the kth half-bridge circuit 10k. A switching transistor M21 is configured to control a connection relationship between the coil module M2 and the second half-bridge circuit 102. Similarly, a switching transistor Mk1 is configured to control a connection relationship between the coil module Mk and the kth half-bridge circuit 10k.

A switching transistor N11 is configured to switch a coil module N1 to be connected to the first half-bridge circuit 101 or the second half-bridge circuit 102. Similarly, a switching transistor Nk1 is configured to switch a coil module Nk to be connected to or disconnected from the kth half-bridge circuit 10k.

It should be noted that the foregoing coil module includes a coil and a capacitor connected in series, and the coil is actually an inductor, that is, the inductor and the capacitor form a series resonant circuit. For ease of description, only the switches are used as examples in the foregoing descriptions. In an actual product, to match different coil modules, there are also a plurality of switching switches corresponding to a coil module array. For example, the switch Mk1 includes more than one switching transistor. Usually, a quantity of resonant circuits included in the coil module Mk is the same as a quantity of corresponding switching switches Mk1.

Through comparison between FIG. 3 in the conventional technology and FIG. 5 provided in this embodiment of this application, it can be learned that a quantity of switching transistors in the transmit end provided in this embodiment of this application is greatly reduced. Because a quantity of bridge arms in the half-bridge inverter circuit is reduced, a quantity of bridge arms that need to be conducted in the multi-coil gating matrix is reduced by half, that is, a quantity of switching transistors in the multi-coil gating matrix is reduced. In addition, a quantity of bridge arms is reduced, and a quantity of switching transistors included in each inverter circuit is also reduced, so that a quantity of switching transistors corresponding to the N charging circuits is greatly reduced, a size of an entire charging circuit is reduced, and a size and costs are reduced.

The transmit end provided in this embodiment of this application may match various adapters. Specific implementations are described below.

Transmit End Embodiment 2

Figure 6:
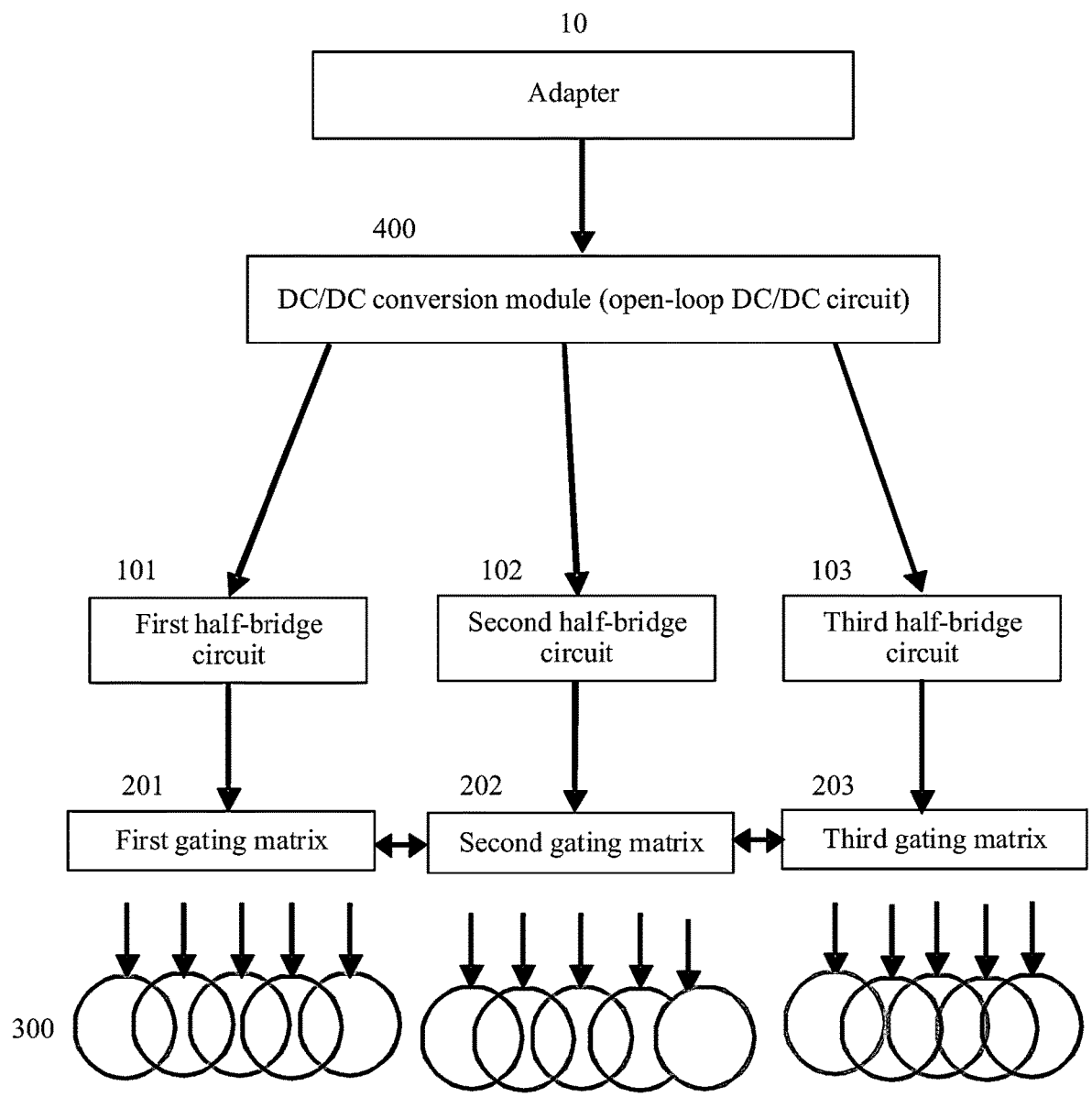
FIG. 6 is a schematic diagram of another transmit end according to an embodiment of this application.

FIG. 6 is a schematic diagram of another transmit end according to an embodiment of this application.

The transmit end provided in this embodiment further includes a direct current/direct current DC/DC conversion module 400.

The direct current/direct current DC/DC conversion module 400 converts an output voltage of an adapter 10 and then outputs N direct currents. The DC/DC conversion module 400 includes at least an open-loop DC/DC circuit.

Input terminals of N half-bridge inverter circuits are respectively connected to the N direct currents. As shown in FIG. 6, that N=3 is still used as an example for description. The N half-bridge inverter circuits are a first half-bridge circuit 101, a second half-bridge circuit 102, and a third half-bridge circuit 103.

Input terminals of the first half-bridge circuit 101, the second half-bridge circuit 102, and the third half-bridge circuit 103 are respectively connected to three output terminals of the DC/DC conversion module 400, or may be connected to one output terminal. This is not specifically limited in this embodiment.

It should be noted that there is only one connection between the DC/DC conversion module 400 provided in this embodiment of this application and the adapter 10. To be specific, regardless of a specific value of N, the DC/DC conversion module 400 has one input terminal, and the DC/DC conversion module 400 may have N output terminals. Compared with FIG. 1, in the transmit end provided in this embodiment of this application, one input terminal, instead of N input terminals, of the DC/DC conversion module 400 is connected to the adapter 10. The N half-bridge circuits may share one open-loop DC/DC circuit, thereby reducing circuit complexity, and reducing a size of a circuit board.

Other connection relationships and circuit architectures in FIG. 6 are the same as those in FIG. 4. Details are not described herein again.

The DC/DC conversion module 400 provided in this embodiment of this application includes at least an open-loop DC/DC circuit, and the open-loop DC/DC circuit implements a main direct current-to-direct current conversion function of the DC/DC conversion module 400, that is, a main conversion ratio of a direct-current voltage is implemented by the open-loop DC/DC circuit. Electric energy conversion efficiency of the open-loop DC/DC circuit is higher than that of a closed-loop DC/DC circuit. Therefore, efficiency of the DC/DC conversion module 400 in this embodiment of this application is higher than that of a conventional closed-loop DC/DC circuit such as a buck/boost circuit. Therefore, in the transmit end provided in this embodiment of this application, wireless charging efficiency can be improved.

A specific implementation of the open-loop DC/DC circuit is not specifically limited in this application. For example, the open-loop DC/DC circuit may be implemented by using a switched-capacitor SC circuit. Whether the SC circuit is a boost circuit or a buck circuit is not limited either. That is, the open-loop DC/DC circuit may be an SC boost circuit or an SC buck circuit. A voltage conversion ratio is not specifically limited in this embodiment either. For example, when the SC circuit is an SC boost circuit, the voltage conversion ratio may be 1:2, 1:3, 1:4, 1:5, or the like, that is, 2× boost, 3× boost, 4× boost, or 5× boost is performed. A specific voltage conversion ratio may be set according to an actual requirement.

To more accurately control a charging voltage output by the transmit end, the DC/DC conversion module may further include a voltage regulator circuit connected to an output terminal of the open-loop DC/DC circuit. The voltage regulator circuit may be specifically implemented by using a closed-loop DC/DC circuit. For example, the DC/DC conversion module further includes N first closed-loop DC/DC circuits. Because the first closed-loop DC/DC circuit can perform closed-loop control, an output voltage of the first closed-loop DC/DC circuit can be accurately adjusted to meet a requirement for wireless charging.

Figure 7:
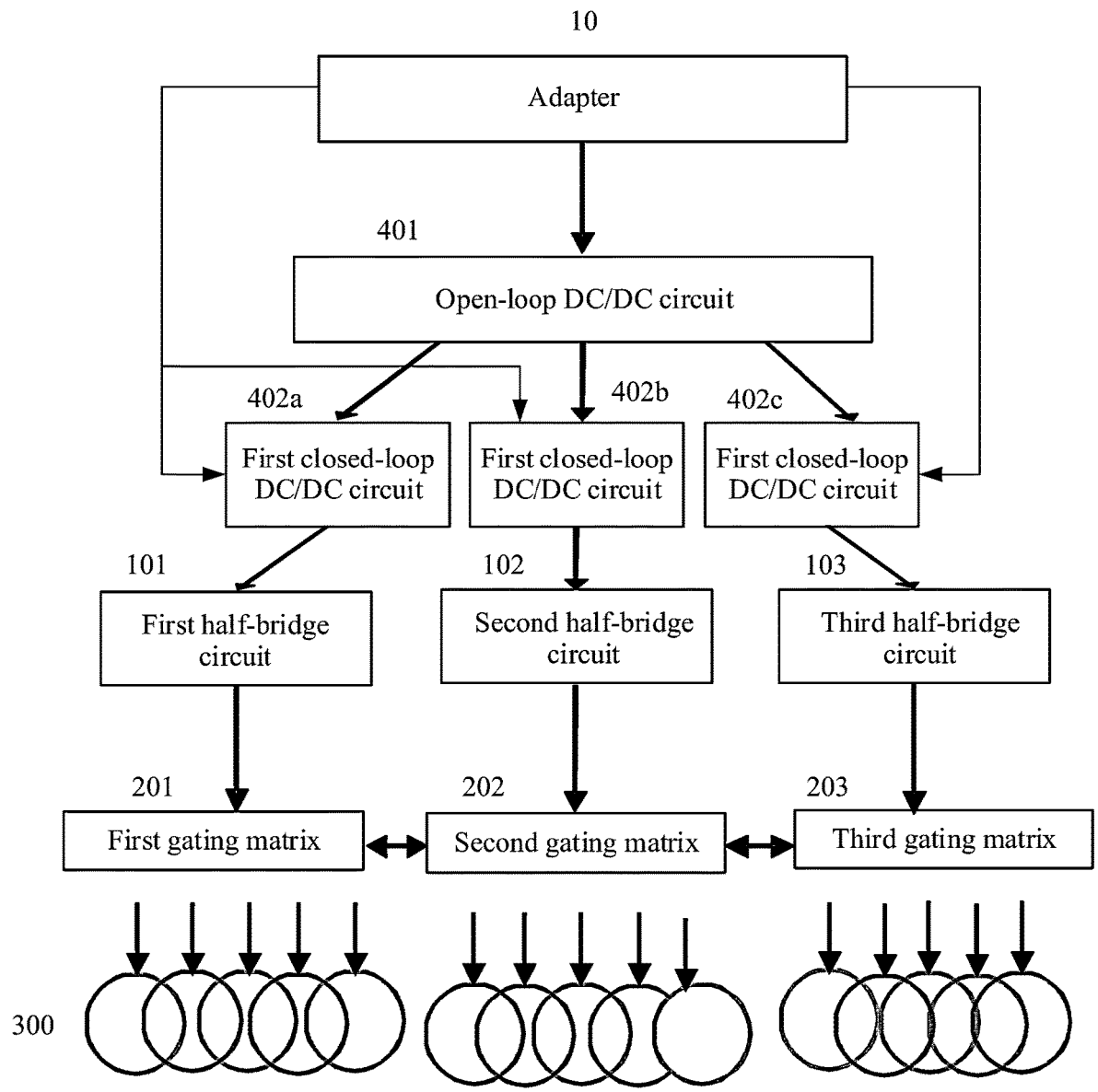
FIG. 7 is a schematic diagram of still another transmit end according to an embodiment of this application.

FIG. 7 is a schematic diagram of still another transmit end according to an embodiment of this application.

A DC/DC conversion module provided in this embodiment includes one open-loop DC/DC circuit 401 and N closed-loop DC/DC circuits, that is, the N closed-loop DC/DC circuits jointly correspond to one open-loop DC/DC circuit 401. An input terminal of the open-loop DC/DC circuit 401 is connected to an output terminal of an adapter 10. An input terminal of each first closed-loop DC/DC circuit is connected to an output terminal of the open-loop DC/DC circuit 401. An output terminal of each first closed-loop DC/DC circuit is connected to an input terminal of a corresponding half-bridge inverter circuit.

As shown in FIG. 7, that N is 3 is still used as an example. To be specific, three closed-loop DC/DC circuits are included: a first closed-loop DC/DC circuit 402a, a first closed-loop DC/DC circuit 402a, and a first closed-loop DC/DC circuit 402a.

An output terminal of the first closed-loop DC/DC circuit 402a is connected to an input terminal of a first half-bridge circuit 101, and an output terminal of the first half-bridge circuit 101 is connected to a first gating matrix 201.

An output terminal of the first closed-loop DC/DC circuit 402b is connected to an input terminal of a second half-bridge circuit 102, and an output terminal of the second half-bridge circuit 102 is connected to a second gating matrix 202.

An output terminal of the first closed-loop DC/DC circuit 402c is connected to an input terminal of a third half-bridge circuit 103, and an output terminal of the third half-bridge circuit 103 is connected to a third gating matrix 203.

The DC/DC conversion module provided in this embodiment includes two stages of DC/DC conversion circuits: an open-loop DC/DC circuit at a first stage, and a closed-loop DC/DC circuit at a second stage. The open-loop DC/DC circuit at the first stage may be an open-loop buck circuit, and a first closed-loop DC/DC circuit at the second stage may be a first closed-loop boost circuit. In addition, based on a specific application scenario, alternatively, the open-loop DC/DC circuit at the first stage may be an open-loop boost circuit, and the first closed-loop DC/DC circuit at the second stage may be a first closed-loop buck circuit. This is not specifically limited in this embodiment of this application.

It should be noted that the input terminals of the first closed-loop DC/DC circuit 402a, the first closed-loop DC/DC circuit 402a, and the first closed-loop DC/DC circuit 402a in FIG. 7 may alternatively be directly connected to the output terminal of the adapter 10, that is, the open-loop DC/DC circuit 401 is directly bypassed. In this case, an output voltage of the adapter 10 can meet a requirement of the first closed-loop DC/DC circuit. In the following descriptions, it is assumed that the DC/DC conversion module includes an open-loop boost circuit at the first stage and a first closed-loop buck circuit at the second stage.

Figure 8:
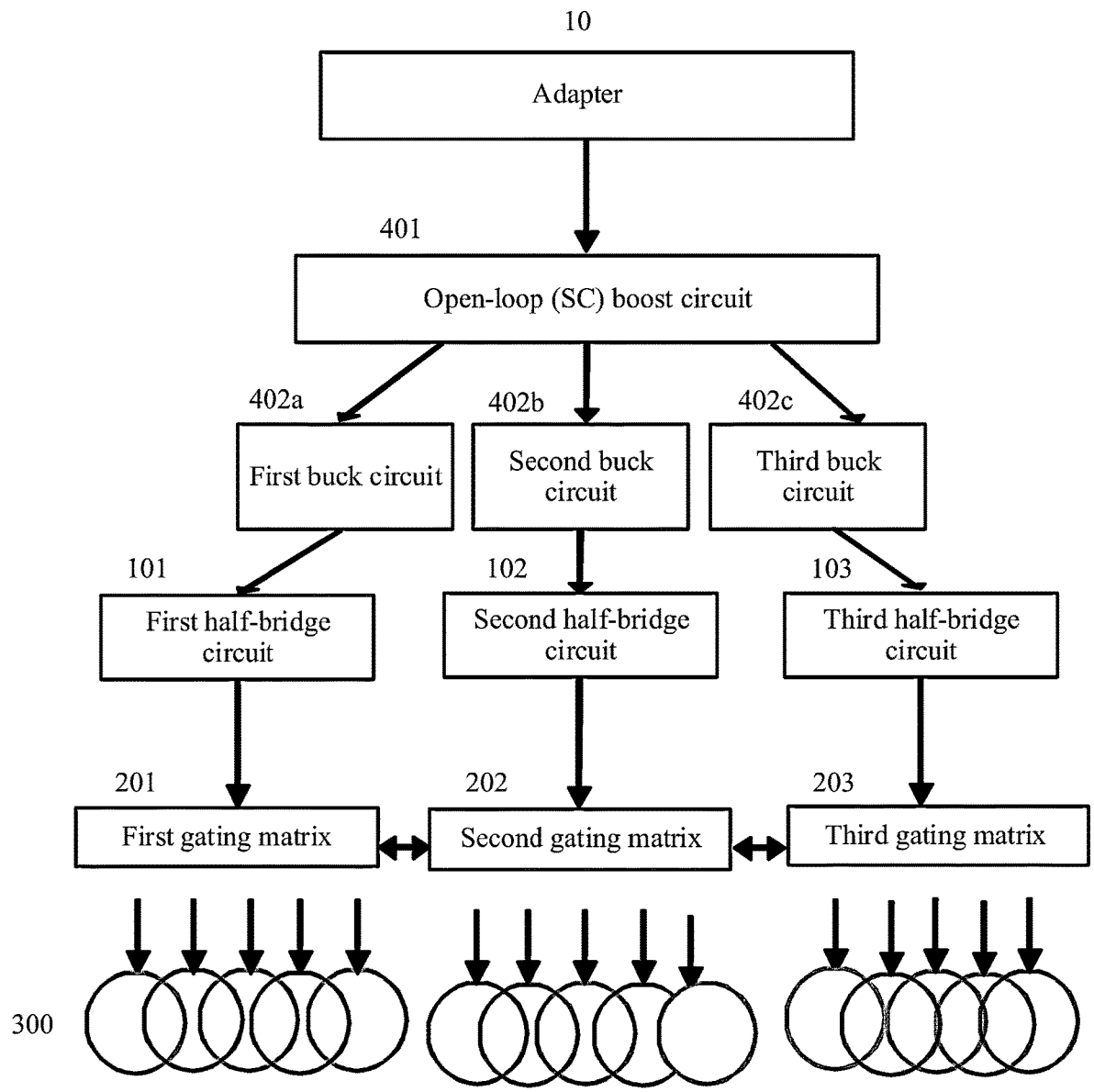
FIG. 8 is a schematic diagram of a DC/DC conversion module including two stages of DC/DC according to an embodiment of this application.

FIG. 8 is a schematic diagram of a DC/DC conversion module including an open-loop boost circuit and a closed-loop buck circuit according to an embodiment of this application.

In this embodiment, N=3 is still used as an example for description. To be specific, that one open-loop boost circuit and three closed-loop boost circuits are included is used as an example. The open-loop boost circuit is described by a switched-capacitor SC boost circuit an example and by using a boost ratio of 1:2, namely, 2× boost, as an example. Alternatively, the open-loop boost circuit may be an SC boost circuit with another ratio. The closed-loop buck circuit is described by using a buck circuit as an example, that is, three buck circuits with a same topology are used as an example.

An input terminal of an SC boost circuit 401 is connected to an adapter 10. An input terminal of a first buck circuit 402a, an input terminal of a second buck circuit 402b, and an input terminal of a third buck circuit 402c are all connected to an output terminal of the SC boost circuit 401. An output terminal of the first buck circuit 402a is connected to an input terminal of a first half-bridge circuit 101, an output terminal of the second buck circuit 402b is connected to an input terminal of a second half-bridge circuit 102, and an output terminal of the third buck circuit 402c is connected to an input terminal of a third half-bridge circuit 103.

It should be noted that, when the transmit end simultaneously charges different electronic devices, the different electronic devices may require different charging voltages and charging currents. Therefore, the first buck circuit 402a, the second buck circuit 402b, and the third buck circuit 402c may choose to operate in different modes. For example, some buck circuits operate in a buck mode, and some buck circuits operate in a straight-through mode. Similarly, the SC circuit may also choose to operate in a straight-through mode or a boost mode. Specifically, setting may be performed with reference to different functions of the adapter. Detailed description is provided below with reference to a flowchart.

The transmit end provided in this embodiment may further include a controller (not shown in the figure). The controller may output a drive signal to switching transistors in the SC circuit and the buck circuit, to control operation modes of the SC circuit and the buck circuit, that is, whether the SC circuit and the buck circuit operate in a straight-through mode or a voltage conversion mode.

The controller is configured to: when the output voltage of the adapter is less than a preset voltage, control the SC circuit to operate in a boost state, and control the buck to operate in a buck state.

The controller is further configured to: when the output voltage of the adapter is adjustable by level, control the SC circuit to operate in a straight-through state, and control the buck circuit to operate in a buck state.

The controller is further configured to: when the output voltage of the adapter is continuously adjustable, control the SC circuit to operate in a straight-through state, and control the buck circuit to operate in a straight-through state.

Figure 9:
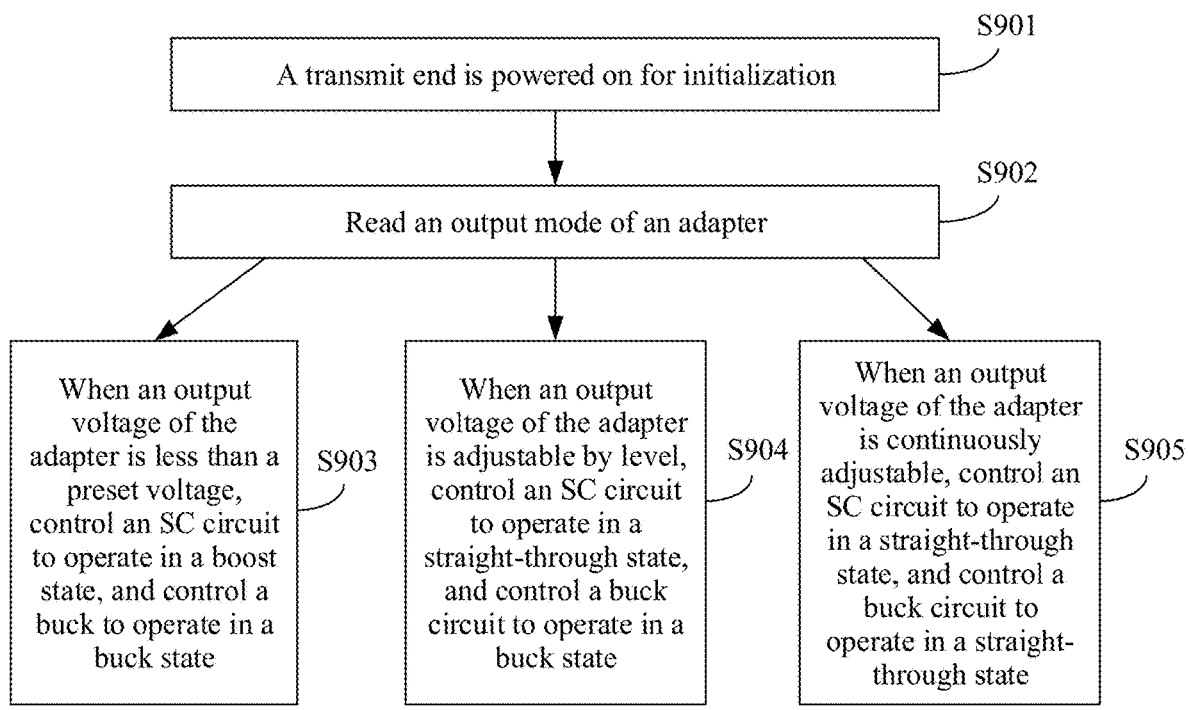
FIG. 9 is a flowchart of a control method corresponding to FIG. 8 according to an embodiment of this application.

FIG. 9 is a flowchart of a control method corresponding to FIG. 8 according to an embodiment of this application.

S901: The transmit end is powered on for initialization.

S902: Read an output mode of the adapter.

The transmit end may communicate with the adapter through a protocol, perform a handshake through communication, and read an adaptation mode of the adapter. The transmit end adjusts an operation mode of an internal charging circuit based on an adaptation capability of the adapter.

The adapter may convert an alternating-current input voltage into a controllable direct-current voltage for output. For an output voltage of the adapter, level-based voltage output or continuously adjustable voltage output may be implemented according to different control protocols. For example, level-based voltages may include the following voltage levels: 5 V, 9 V, 12 V and 20 V.

S903: When the output voltage of the adapter is less than a preset voltage, control the SC circuit to operate in a boost state, and control the buck to operate in a buck state.

The preset voltage may be set according to an actual requirement, for example, may be set to 5 V. When the output voltage of the adapter does not support a voltage higher than 5 V, the SC circuit may operate in a 1:2 boost state or a 1:4 boost state. A next-stage buck circuit may accurately control the output voltage to support an input voltage of a half-bridge circuit of an electronic device. That is, a charging voltage for wirelessly charging the electronic device by the transmit end needs to be implemented by the buck circuit by adjusting the input voltage of the half-bridge circuit.

S904: When the output voltage of the adapter is adjustable by level, control the SC circuit to operate in a straight-through state, and control the buck circuit to operate in a buck state.

If the adapter supports level-based voltage output, the transmit end may make, through communication, the output voltage of the adapter be greater than an input voltage of a corresponding half-bridge circuit during fast charging of an electronic device such as a mobile phone. Because the output voltage of the adapter is sufficiently high, the SC circuit does not need to perform boost, and the input voltage of the half-bridge circuit may be accurately controlled by using the buck circuit.

S905: When the output voltage of the adapter is continuously adjustable, control the SC circuit to operate in a straight-through state, and control the buck circuit to operate in a straight-through state.

If the adapter supports continuously adjustable voltage output, both the SC circuit and the buck circuit may operate in a straight-through state, and the adapter adjusts and controls the input voltage of the half-bridge circuit.

Therefore, the transmit end provided in this embodiment is compatible with various types of adapters with different functions, and is also applicable to different types of electronic devices, that is, applicable to different types of loads, and can simultaneously wirelessly charge a plurality of loads of different types. An operation mode of a charging circuit in the transmit end may be any combination of a boost mode, a straight-through mode, and a buck mode, to really implement a one-to-many charging architecture. The SC circuit is an open-loop voltage conversion circuit, and therefore has high operation efficiency, thereby reducing an electric energy loss, improving wireless charging efficiency, and reducing heat dissipation.

A circuit diagram of a DC/DC conversion module according to an embodiment of this application is specifically described below with reference to FIG. 10.

Figure 10:
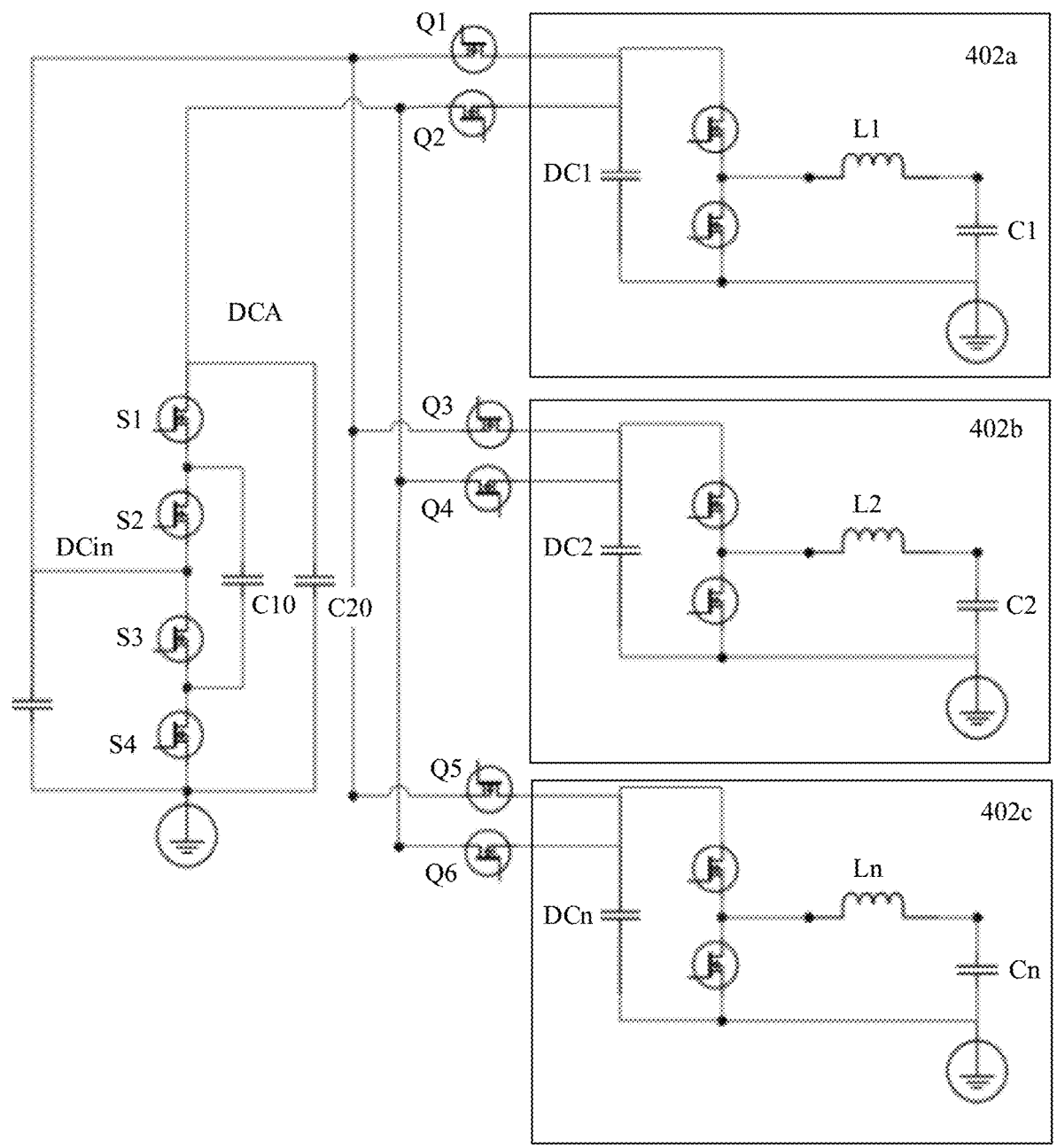
FIG. 10 is a schematic diagram of a DC/DC conversion module including three stages of DC/DC conversion circuits according to an embodiment of this application.

An SC boost circuit in FIG. 10 is described by using 2× boost at 1:2 as an example. That N is 3 is still used as an example for description. To be specific, three buck circuits are included: a first buck circuit 402a, a second buck circuit 402b, and a third buck circuit 403c.

The SC boost circuit includes four switching transistors (S1, S2, S3, and S4) and two capacitors (C10 and C20).

The first switching transistor S1 to the fourth switching transistor S4 are sequentially connected in series. To be specific, a second terminal of the first switching transistor S1 is connected to a first terminal of the second switching transistor S2, a second terminal of the second switching transistor S2 is connected to a first terminal of the third switching transistor S3, a second terminal of the third switching transistor S3 is connected to a first terminal of the fourth switching transistor S4, a second terminal of the fourth switching transistor S4 is connected to a negative electrode of a direct-current power supply DCin, and a first terminal of the first switching transistor S1 is connected to a positive electrode of the direct-current power supply DCin.

A first terminal of the first capacitor C10 is connected to the second terminal of S1, and a second terminal of the first capacitor C10 is connected to the second terminal of S3.

A first terminal of the second capacitor C20 is connected to the first terminal of S1, and a second terminal of the C20 is connected to the second terminal of S4.

An input terminal of each buck circuit is connected to two different output terminals of the SC circuit through two switches respectively. When the SC circuit operates in a straight-through mode, a voltage of the direct-current power supply DCin connected to an input terminal of the SC voltage is directly provided for the buck circuit. When the SC circuit operates in a boost mode, a voltage of an output terminal DCA of the SC circuit is provided for the input terminal of the buck.

Specifically, refer to FIG. 10. An input terminal of the first buck 402a is connected to the DCin through a first switch Q1, and the input terminal of the first buck 402a is connected to the DCA through a second switch Q2. An input terminal of the second buck 402b is connected to the DCin through a third switch Q3, and the input terminal of the second buck 402b is connected to the DCA through a fourth switch Q4. An input terminal of the third buck 402c is connected to the DCin through a fifth switch Q5, and the input terminal of the third buck 402c is connected to the DCA through a sixth switch Q6.

It should be noted that on/off states of the S1 and the S3 are the same, on/off states of the S2 and the S4 are the same, and on/off states of the S1 and the S2 are complementary. On/off states of the Q1 and the Q2 are complementary, that is, the Q1 and the Q2 are not simultaneously switched on. Similarly, on/off states of the Q3 and the Q4 are complementary, and on/off states of the Q5 and the Q6 are complementary.

The first buck circuit 402a is used as an example below for description. When the Q1 is switched on and the Q2 is switched off, the input terminal of the first buck circuit 402a is connected to the DCin through the Q1. In this case, the SC circuit operates in a straight-through state, that is, the input terminal of the first buck circuit 402a is directly connected to an output terminal of an adapter. On the contrary, when the Q1 is switched off and the Q2 is switched on, the input terminal of the first buck circuit 402a is connected to the DCA through the Q2. In this case, the SC circuit operates in a 2× boost mode.

To enable persons skilled in the art to better understand a principle of the 2× boost at 1:2 in this embodiment of this application, an operation principle of the SC circuit is described below with reference to accompanying drawings.

Figure 11:
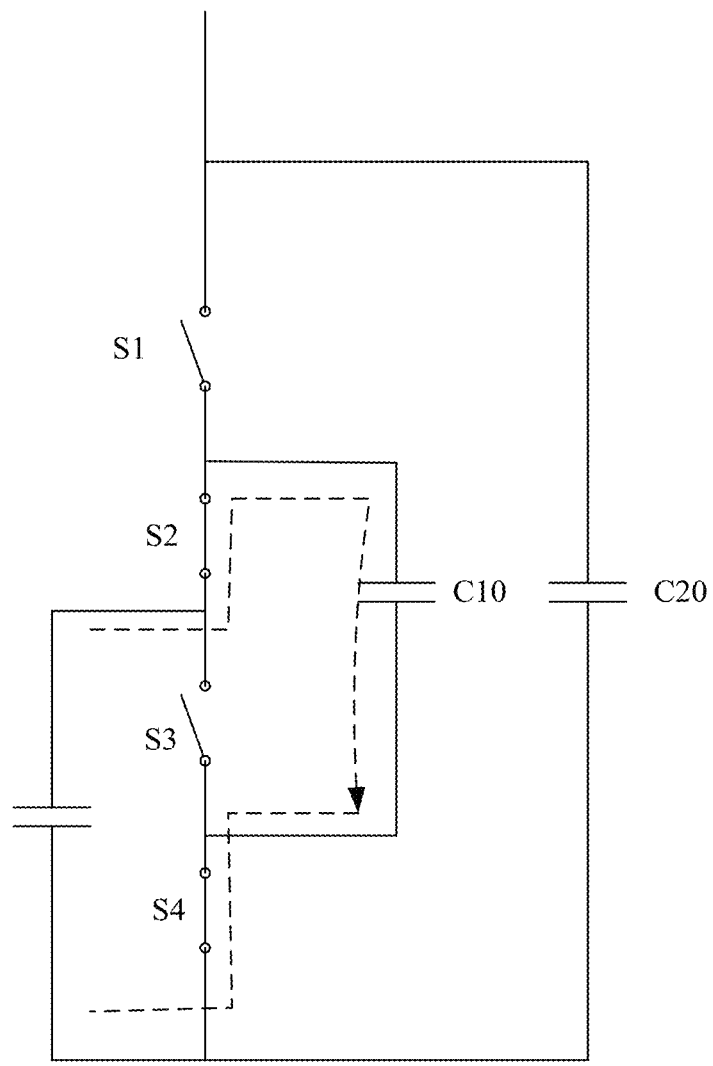
FIG. 11 is a schematic diagram in which S2 and S4 in an SC circuit in FIG. 10 are switched on according to an embodiment of this application.

FIG. 11 is a schematic diagram in which the S2 and the S4 in the SC circuit in FIG. 10 are switched on.

FIG. 11 shows a corresponding closed loop when both the S2 and the S4 are switched on, and both the S1 and the S3 are switched off. A current path is DCin-S2-C10-S4-DCin, that is, a voltage on the C10 is a voltage of the DCin.

Figure 12:
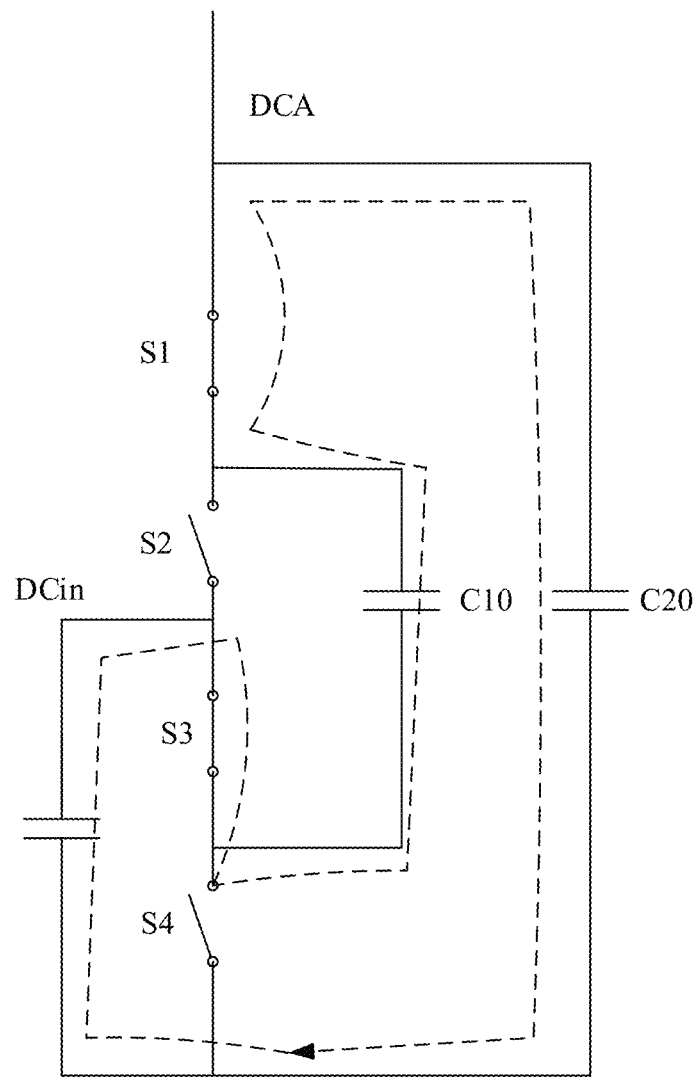
FIG. 12 is a schematic diagram in which S1 and S3 in an SC circuit in FIG. 10 are switched on according to an embodiment of this application.

FIG. 12 is a schematic diagram in which the S1 and the S3 in the SC circuit in FIG. 10 are switched on.

FIG. 12 shows a corresponding closed loop when both the S1 and the S3 are switched on, and both the S2 and the S4 are switched off. A current path is DCin-S3-C10-S1-C20-DCin, that is, a voltage on the C20 is a sum of a voltage on the C10 and a voltage on the DCin. Therefore, the voltage on the D20 is 2×-boosted relative to the voltage on the DCin, that is, a voltage output by the DCA end is twice the voltage on the DCin.

Transmit End Embodiment 3

The DC/DC conversion module described above includes two stages of DC/DC conversion: an open-loop DC/DC circuit at a first stage, and a closed-loop DC/DC circuit at a second stage. The following describes a case that the DC/DC conversion module includes three stages of DC/DC conversion circuits: a second closed-loop DC/DC circuit at a first stage, an open-loop DC/DC circuit at a second stage, and a first closed-loop DC/DC circuit at a third stage.

Figure 13:
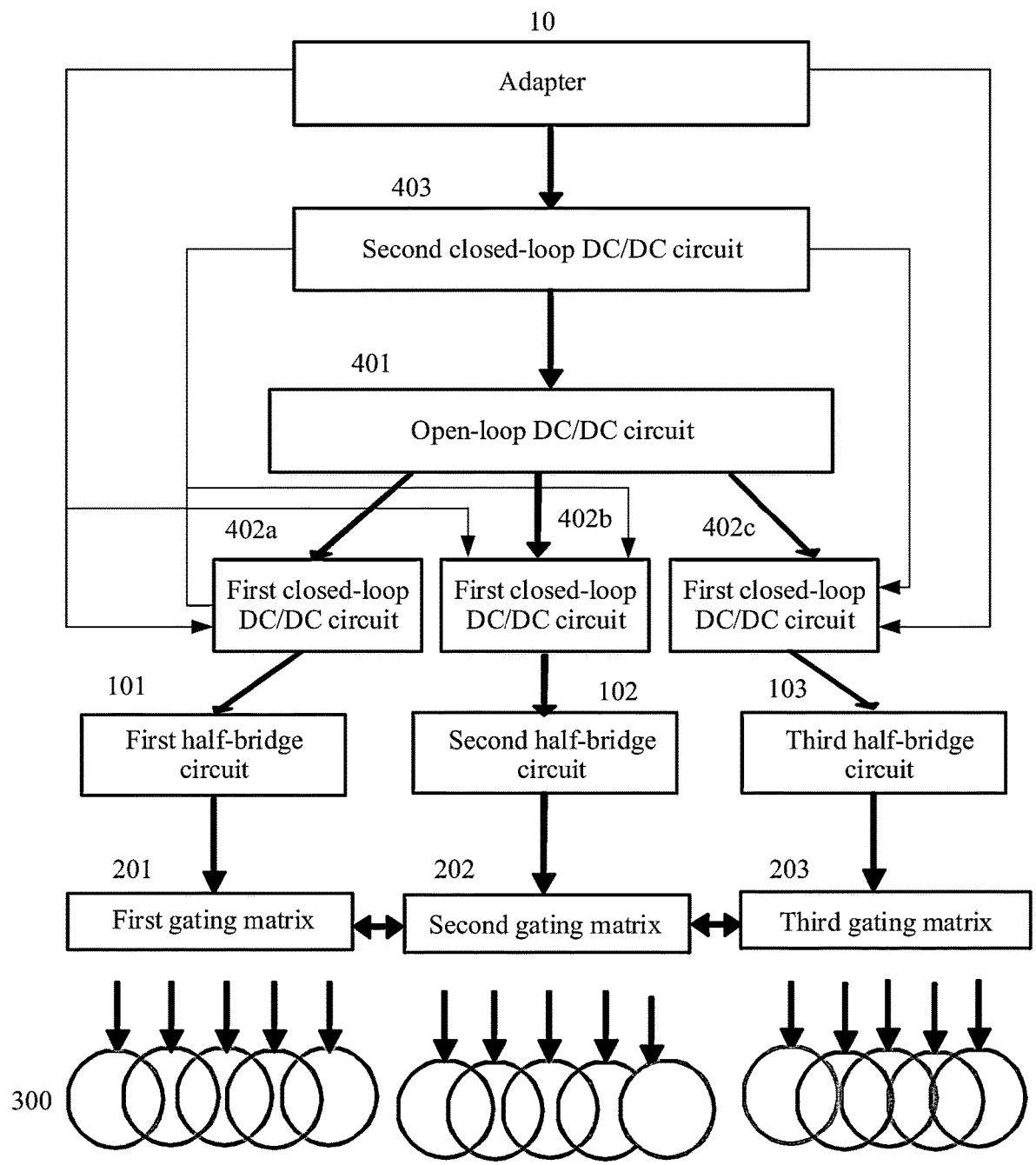
FIG. 13 is a schematic diagram of a DC/DC conversion module including three stages of DC/DC conversion circuits according to an embodiment of this application.

FIG. 13 is a schematic diagram of a DC/DC conversion module including three stages of DC/DC conversion circuits according to an embodiment of this application.

The DC/DC conversion module includes one second closed-loop DC/DC circuit 403, one open-loop DC/DC circuit 401, and N closed-loop DC/DC circuits, that is, the N closed-loop DC/DC circuits jointly correspond to one open-loop DC/DC circuit 401. An input terminal of the second closed-loop DC/DC circuit 403 is connected to an output terminal of an adapter 10. An input terminal of the open-loop DC/DC circuit 401 is connected to an output terminal of the second closed-loop DC/DC circuit 403. An input terminal of each first closed-loop DC/DC circuit is connected to an output terminal of the open-loop DC/DC circuit 401. An output terminal of each first closed-loop DC/DC circuit is connected to an input terminal of a corresponding half-bridge inverter circuit.

As shown in FIG. 13, that N is 3 is still used as an example. To be specific, three closed-loop DC/DC circuits are included: a first closed-loop DC/DC circuit 402a, a first closed-loop DC/DC circuit 402a, and a first closed-loop DC/DC circuit 402a.

An output terminal of the first closed-loop DC/DC circuit 402a is connected to an input terminal of a first half-bridge circuit 101, and an output terminal of the first half-bridge circuit 101 is connected to a first gating matrix 201.

An output terminal of the first closed-loop DC/DC circuit 402b is connected to an input terminal of a second half-bridge circuit 102, and an output terminal of the second half-bridge circuit 102 is connected to a second gating matrix 202.

An output terminal of the first closed-loop DC/DC circuit 402c is connected to an input terminal of a third half-bridge circuit 103, and an output terminal of the third half-bridge circuit 103 is connected to a third gating matrix 203.

It can be learned from FIG. 13 that, although the DC/DC conversion module includes three stages of DC/DC conversion circuits, only a closed-loop DC/DC conversion circuit at the last stage includes N channels, and DC/DC conversion circuits at the first two stages each include only one channel. This can simplify a circuit structure, reduce a quantity of electrical elements, reduce a size of a circuit, reduce costs, reduce power consumption, and facilitate heat dissipation.

In addition, when an output voltage of the adapter 10 can meet a requirement of a next stage, the input terminals of the first closed-loop DC/DC circuit 402a, the first closed-loop DC/DC circuit 402a, and the first closed-loop DC/DC circuit 402a may be directly connected to the output terminal of the adapter 10, that is, both the second closed-loop DC/DC circuit 403 and the open-loop DC/DC circuit 401 are bypassed.

Similarly, when an output voltage of the second closed-loop DC/DC circuit 403 can meet a requirement of a next stage, the input terminals of the first closed-loop DC/DC circuit 402a, the first closed-loop DC/DC circuit 402a, and the first closed-loop DC/DC circuit 402a may be directly connected to the output terminal of the second closed-loop DC/DC circuit 403, that is, the open-loop DC/DC circuit 401 is bypassed.

The DC/DC conversion module provided in this embodiment includes three stages of DC/DC conversion circuits: a closed-loop DC/DC circuit at a first stage, an open-loop DC/DC circuit at a second stage, and a closed-loop DC/DC circuit at a third stage. The closed-loop DC/DC circuit at the first stage may be a closed-loop boost circuit, the open-loop DC/DC circuit at the second stage may be an open-loop boost circuit, and the first closed-loop DC/DC circuit at the third stage may be a closed-loop buck circuit. That is, the circuits at the first two stages are boost circuits, and the circuit at the last stage is a buck circuit. In addition, based on a specific application scenario, alternatively, the closed-loop DC/DC circuit at the first stage may be a buck circuit, the open-loop DC/DC circuit at the second stage may be a buck circuit, and the closed-loop DC/DC circuit at the third stage may be a boost circuit. That is, the circuits at the first two stages are buck circuits, and the circuit at the last stage is a boost circuit. The three stages of DC/DC circuits are not specifically limited in this embodiment of this application. The three stages of DC/DC circuits may be any combination of a boost circuit and a buck circuit.

The DC/DC conversion module in the transmit end provided in this embodiment includes three stages of DC/DC conversion circuits. Therefore, the output voltage of the adapter can be converted more finely. This can reduce a requirement for the adapter, and is applicable to an adapter with a weak adjustment capability, thereby expanding a use scenario of the transmit end, and making the transmit end have higher universality.

Description is provided below by using an example in which the three stages of DC/DC conversion circuits included in the DC/DC conversion module are a closed-loop boost DC/DC conversion circuit, an open-loop boost DC/DC conversion circuit, and a closed-loop buck DC/DC conversion circuit.

Figure 14:
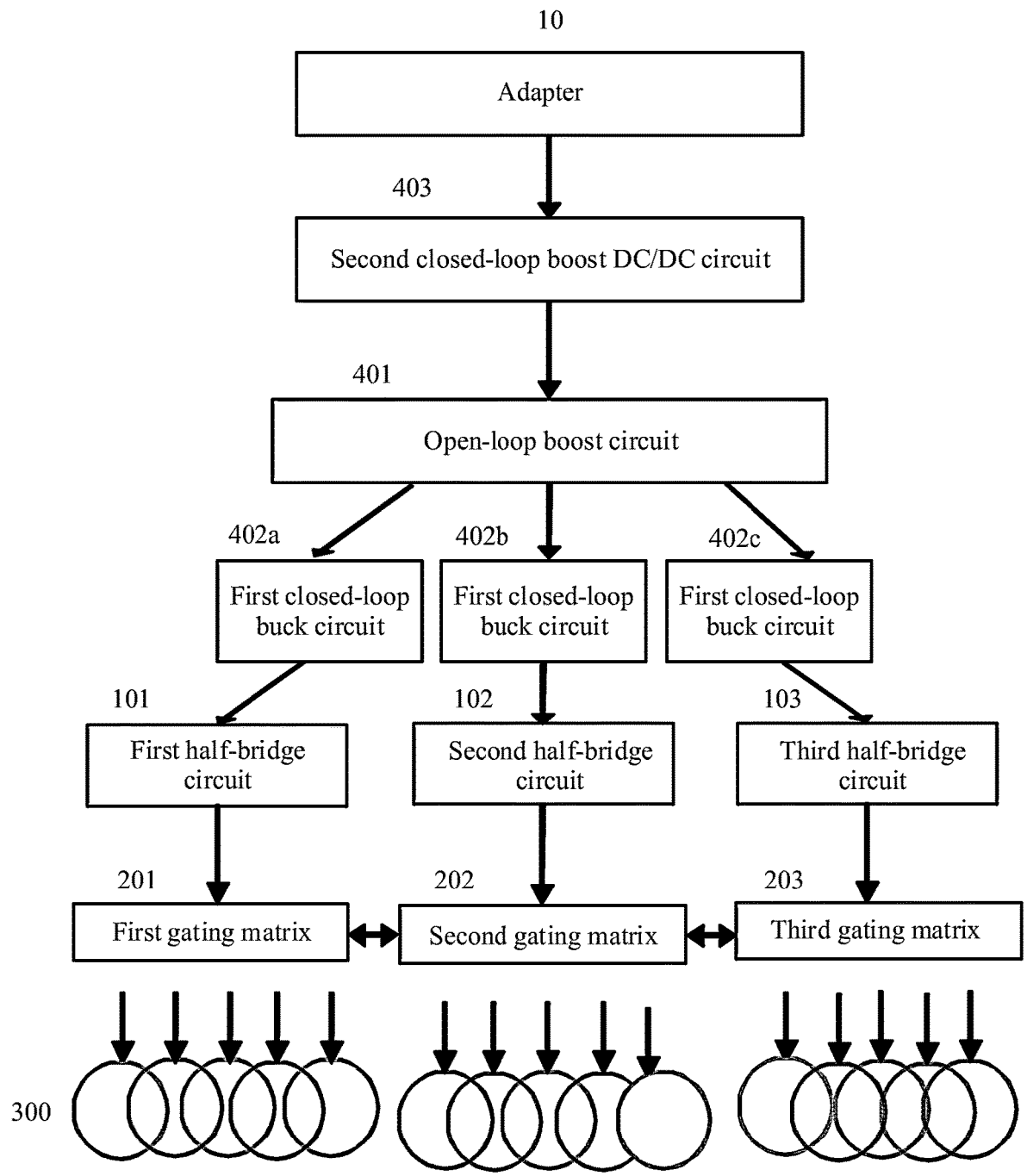
FIG. 14 is another schematic diagram of a DC/DC conversion module including three stages of DC/DC conversion circuits according to an embodiment of this application.

FIG. 14 is another schematic diagram of a DC/DC conversion module including three stages of DC/DC conversion circuits according to an embodiment of this application.

In FIG. 14, that N is 3 is still used as an example for description.

In FIG. 14, second closed-loop boost DC/DC conversion circuit 403 is disposed at a first stage, an input terminal of the second closed-loop boost DC/DC conversion circuit 403 is connected to an output terminal of an adapter 10, an output terminal of the second closed-loop boost DC/DC conversion circuit 403 is connected to an input terminal of an open-loop boost circuit 401, and an output terminal of the open-loop boost circuit 401 is connected to input terminals of three closed-loop boost circuits. To be specific, an input terminal of a first closed-loop buck circuit 402a is connected to the output terminal of the open-loop boost circuit 401, an input terminal of a second closed-loop buck circuit 402b is connected to the output terminal of the open-loop boost circuit 401, and an input terminal of a third closed-loop buck circuit 402c is connected to the output terminal of the open-loop boost circuit 401.

An output terminal of the first closed-loop buck circuit 402a is connected to an output terminal of a first half-bridge circuit 101, an output terminal of the first closed-loop buck circuit 402b is connected to an output terminal of a second half-bridge circuit 102, and an output terminal of the first closed-loop buck circuit 402c is connected to an output terminal of a third half-bridge circuit 103.

Figure 15:
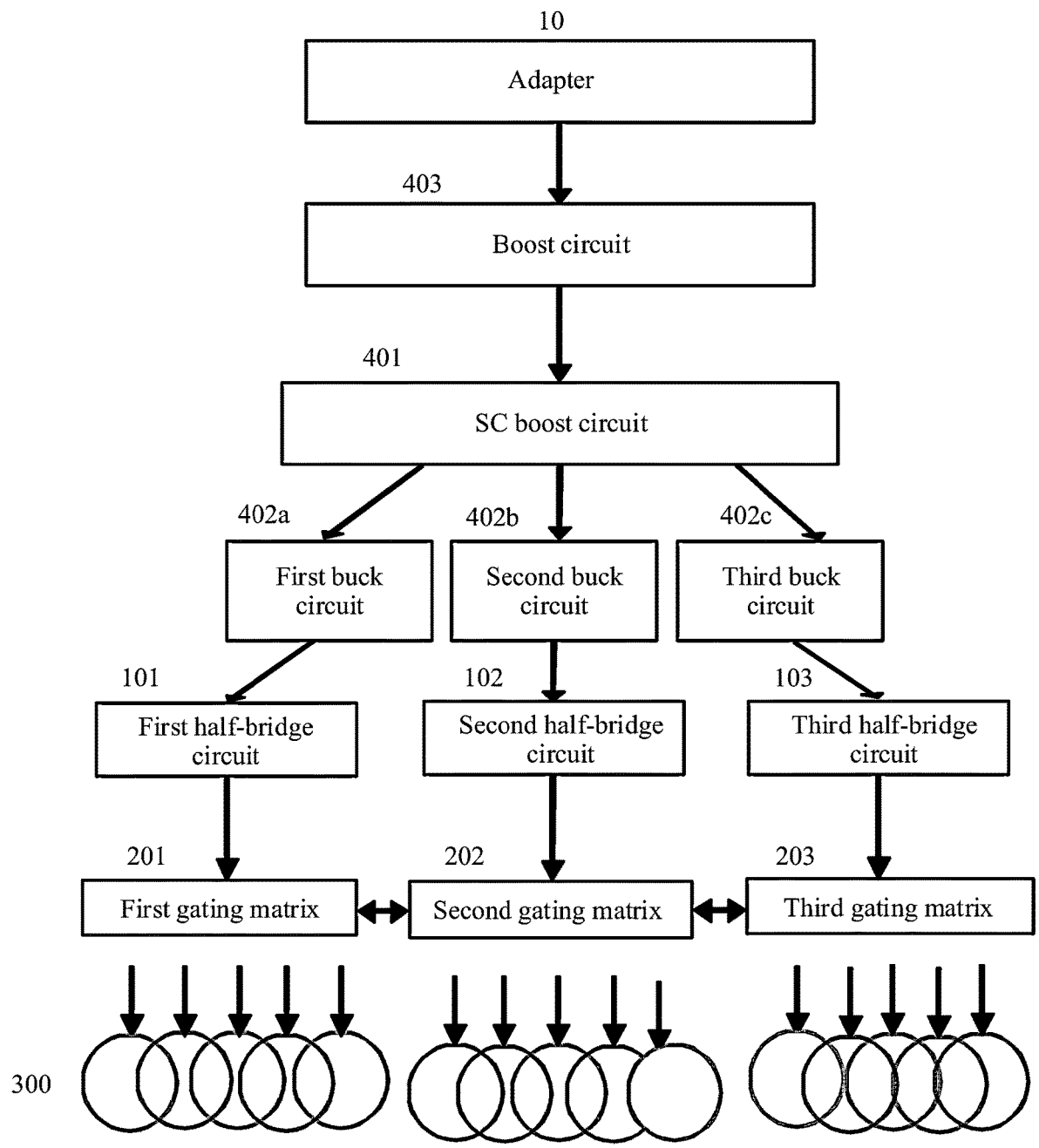
FIG. 15 is a schematic diagram corresponding to FIG. 14 according to an embodiment of this application.

FIG. 15 is a schematic diagram corresponding to FIG. 14.

Description is provided below by using an example in which the second closed-loop boost DC/DC conversion circuit is a boost circuit 403, the first closed-loop buck circuit is a buck circuit, and the open-loop boost circuit is an SC boost circuit.

A difference between FIG. 15 and FIG. 8 lies only in that on stage of boost circuit 403 is added between the adapter 10 and the SC boost circuit 401, and the rest is the same as that in FIG. 8. Details are not described herein again.

It should be noted that, when the DC/DC conversion module includes three stages, when the transmit end can simultaneously charge different electronic devices, the different electronic devices may require different charging voltages and charging currents. Therefore, the boost circuit, the SC circuit, the first buck circuit 402a, the second buck circuit 402b, and the third buck circuit 402c may choose to operate in different modes. For example, some buck circuits operate in a buck mode, and some operate in a straight-through mode. Similarly, the SC circuit may also choose to operate in a straight-through mode or a boost mode, and the boost circuit may also choose to operate in a straight-through mode or a boost mode. This may be specifically set with reference to different functions of the adapter. Detailed description is provided below with reference to a flowchart.

In the three-stage DC/DC conversion module provided in this embodiment, a boost ratio of the SC circuit is fixed. Therefore, in a case that a voltage-adjustable boost circuit is added, boost adjustment can be more flexible, and controllability of an output voltage is improved, to adapt to different types of loads and improve universality of the transmit end.

The transmit end provided in this embodiment may further include a controller (not shown in the figure). The controller may output a drive signal to switching transistors in the boost circuit, the SC circuit, and the buck circuit, to control operation modes of the boost circuit, the SC circuit, and the buck circuit, that is, whether the boost circuit, the SC circuit, and the buck circuit operate in a straight-through mode or a voltage conversion mode.

To be specific, the transmit end provided in this embodiment further includes a controller, where the controller is configured to: when the output voltage of the adapter is less than a preset voltage, control the boost circuit to operate in a boost state, control the SC circuit to operate in a boost state, and control the buck to operate in a buck state;

the controller is further configured to: when the output voltage of the adapter is adjustable by level, control the boost circuit to operate in a straight-through state, control the SC circuit to operate in a straight-through state, and control the buck circuit to operate in a buck state; and the controller is further configured to: when the output voltage of the adapter is continuously adjustable, control the boost circuit to operate in a straight-through state, control the SC circuit to operate in a straight-through state, and control the buck circuit to operate in a straight-through state.

An operation process of the transmit end provided in this embodiment is described below with reference to a flowchart.

Figure 16:
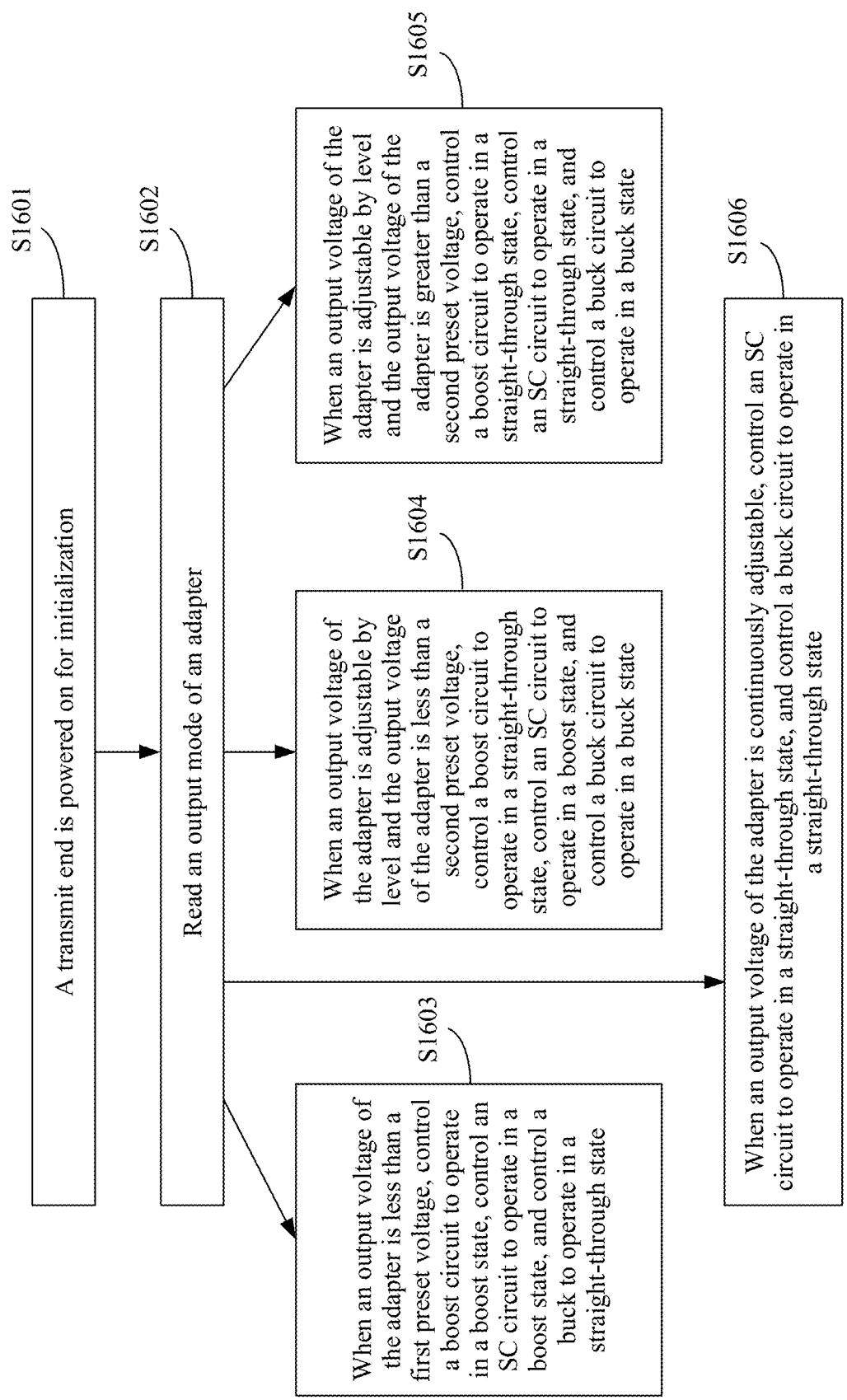
FIG. 16 is a flowchart of a control method corresponding to FIG. 15 according to an embodiment of this application.

FIG. 16 is a flowchart of a control method corresponding to FIG. 15 according to an embodiment of this application.

S1601: The transmit end is powered on for initialization.

S1602: Read an output mode of the adapter.

The transmit end may communicate with the adapter through a protocol, perform a handshake through communication, and read an adaptation mode of the adapter. The transmit end adjusts an operation mode of an internal charging circuit based on an adaptation capability of the adapter.

The adapter may convert an alternating-current input voltage into a controllable direct-current voltage for output. For an output voltage of the adapter, level-based voltage output or continuously adjustable voltage output may be implemented according to different control protocols. For example, level-based voltages may include the following voltage levels: 5 V, 9 V, 12 V, and 20 V. Different voltage levels may correspond to different load charging powers.

S1603: When the output voltage of the adapter is less than a first preset voltage, control the boost circuit to operate in a boost state, control the SC circuit to operate in a boost state, and control the buck to operate in a straight-through state.

The preset voltage may be set according to an actual requirement, for example, may be set to 5 V. When the output voltage of the adapter does not support a voltage higher than 5 V, the boost circuit operates in a boost state, that is, the boost circuit is configured to implement boost within a small range, and boost at a high ratio is still completed by using the SC circuit. The SC circuit may operate in a 1:2 boost state, a 1:4 boost state, or a boost state with a higher voltage ratio. A next-stage buck circuit may accurately control the output voltage to support an input voltage of a half-bridge circuit of an electronic device. That is, a charging voltage for wirelessly charging the electronic device by the transmit end needs to be implemented by the buck circuit by adjusting the input voltage of the half-bridge circuit. For example, the boost circuit boosts a voltage that is less than 5 V and that is output by the adapter to 5 V, and then the SC circuit boosts the voltage of 5 V to 20 V, that is, 4× boost is implemented. The buck circuit then finely regulates the voltage of 20 V to 18 V.

Boost of the transmit end is mainly implemented by the SC circuit, and operation efficiency of the SC circuit is much higher than that of the boost circuit and the buck circuit. Therefore, with the transmit end, charging efficiency can be improved.

S1604: When the output voltage of the adapter is adjustable by level and the output voltage of the adapter is less than a second preset voltage, control the boost circuit to operate in a straight-through state, control the SC circuit to operate in a boost state, and control the buck circuit to operate in a buck state, where the second preset voltage is greater than the first preset voltage.

If the adapter supports level-based voltage output, the transmit end may make, through communication, the output voltage of the adapter be greater than an input voltage of a corresponding half-bridge circuit during fast charging of an electronic device such as a mobile phone. Because the output voltage of the adapter is sufficiently high, one stage may be selected to complete boost, for example, the boost performs boost, or the SC performs boost, and then the buck circuit accurately controls an input voltage of a half-bridge circuit.

S1605: When the output voltage of the adapter is adjustable by level and the output voltage of the adapter is greater than a second preset voltage, control the boost circuit to operate in a straight-through state, control the SC circuit to operate in a straight-through state, and control the buck circuit to operate in a buck state, where the second preset voltage is greater than the first preset voltage.

If the output voltage of the adapter is sufficiently high, the two stages of boost circuits may be in a straight-through state, and the buck circuit at the last stage accurately controls an output voltage, to provide the output voltage for an input terminal of a half-bridge circuit.

S1606: When the output voltage of the adapter is continuously adjustable, control the boost circuit to operate in a straight-through state, control the SC circuit to operate in a straight-through state, and control the buck circuit to operate in a straight-through state.

If the adapter supports continuously adjustable voltage output, all the three stages of DC/DC circuits may operate in a straight-through mode, and the adapter accurately adjusts and controls an input voltage of a half-bridge circuit.

Therefore, the transmit end provided in this embodiment is compatible with various types of adapters with different functions, and is also applicable to different types of electronic devices, that is, applicable to different types of loads, and can simultaneously wirelessly charge a plurality of loads of different types. Operation modes of the three stages of DC/DC conversion circuits in the transmit end may be any combination of a boost mode, a straight-through mode, and a buck mode, to really implement a one-to-many charging architecture. The SC circuit is an open-loop voltage conversion circuit, and therefore has high operation efficiency, thereby reducing an electric energy loss, improving wireless charging efficiency, and reducing heat dissipation. In addition, one stage of boost circuit is added to compensate for a disadvantage that the SC circuit can perform boost only at a fixed ratio, and flexibility of voltage adjustment is implemented by using the boost circuit.

Figure 17:
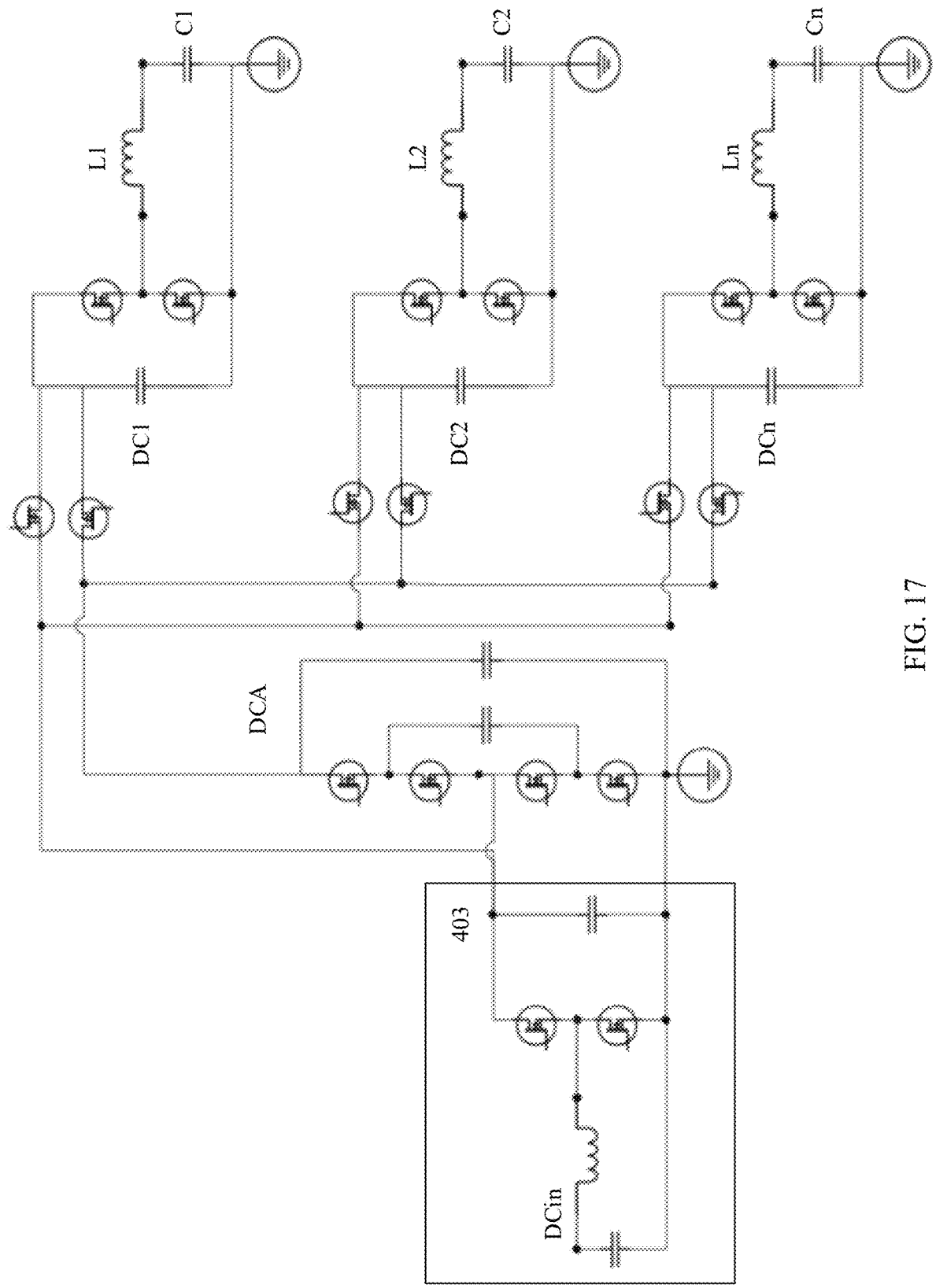
FIG. 17 is a circuit diagram corresponding to FIG. 15 according to an embodiment of this application.

An implementation of the three stages of DC/DC conversion circuits provided in this embodiment is described below. FIG. 17 is a circuit diagram corresponding to FIG. 15 according to an embodiment of this application.

Compared with FIG. 10, in FIG. 17, only one stage of boost circuit 403 is added. To be specific, an input terminal of the boost circuit 403 is connected to the output terminal DCin of the adapter, and an output terminal of the boost circuit 403 is connected to the input terminal of the SC circuit. Other connection relationships are the same as those in FIG. 15, and details are not described herein again.

Compared with a transmit end provided in the conventional technology, the transmit end for one-to-many charging provided in the foregoing embodiments has advantages of a simple structure and high charging efficiency. A high voltage conversion ratio is implemented by using an open-loop DC/DC circuit, for example, the SC circuit, thereby improving charging efficiency. Fine voltage adjustment is implemented by using a closed-loop DC/DC circuit. That is, the open-loop DC/DC circuit implements coarse voltage adjustment at a high ratio, the closed-loop DC/DC circuit implements fine voltage adjustment at a low ratio, and the closed-loop DC/DC circuit is mainly configured to implement voltage regulation. The SC circuit is configured to be compatible with different adapters, to implement a high-ratio voltage conversion function.

It should be noted that the transmit end that is provided in the foregoing embodiments of this application and that is used for wirelessly charging an electronic device is applicable to a case in which a charging plane is continuous and not partitioned, and is also applicable to a case in which a charging plane is partitioned and discontinuous.

That the charging plane is continuous and not partitioned means that a size of a receive coil of a receive end (a charged electronic device such as a mobile phone) is not distinguished, and the receive coil can be flexibly placed in a charging area. In this case, the transmit end needs to select an appropriate power conversion unit (the DC/DC conversion module and the half-bridge circuit provided in embodiments of this application) and an appropriate transmit coil for power supply based on a location of the receive end, and a charging circuit and a transmit coil are selected by using a gating matrix.

Because the transmit end provided in embodiments of this application is applicable to the scenario in which a charging plane is continuous and not partitioned, the transmit end is compatible with the scenario in which a charging plane is partitioned and discontinuous.

That a charging plane is partitioned means that a charging area in which a large-size receive end (for example, a mobile phone) can be flexibly placed is provided, and a wireless charging function can be implemented at different locations in the area; and a fixed charging area is provided for a small-size receive end (for example, a watch), and wireless charging can be implemented for the small-size electronic device only at a fixed location.

Transmit End Embodiment 4

In the three-stage DC/DC conversion module described in the foregoing embodiments, an example in which boost circuits are disposed at the first two stages and a buck circuit is disposed at the last stage is used. Alternatively, when the voltage output by the adapter is high, buck circuits are disposed at the first two stages, and a boost circuit is disposed at the last stage. The boost circuit at the last stage is mainly configured to finely adjust a voltage, and mainly has a function of implementing voltage regulation.

Figure 18:
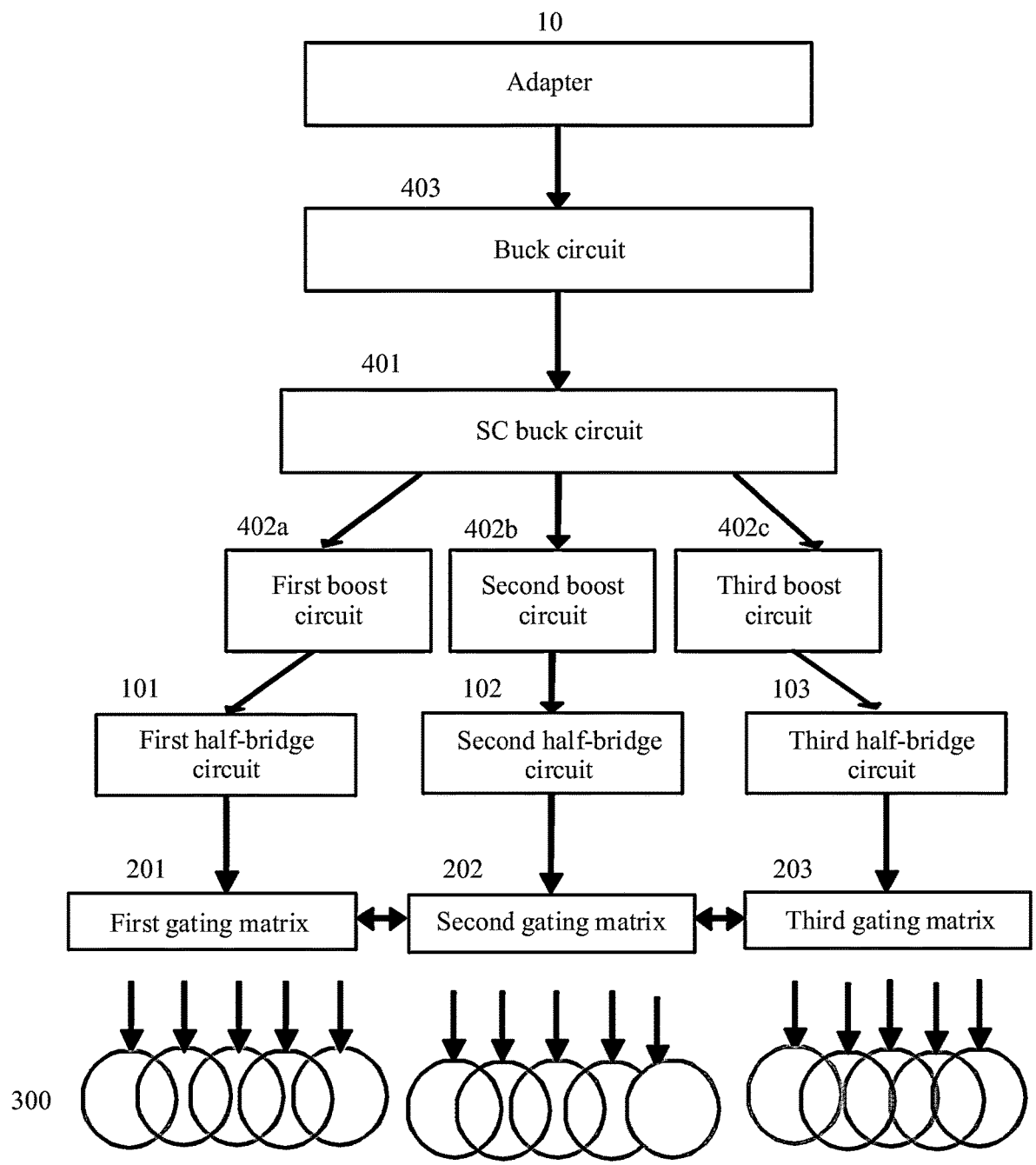
FIG. 18 is a schematic diagram of another transmit end according to an embodiment of this application.

FIG. 18 is a schematic diagram of another transmit end according to an embodiment of this application.

It can be learned from FIG. 18 that a buck circuit 403 is disposed at a first stage, an SC buck circuit 401 is disposed at a second stage, and buck circuits 402a to 402c are disposed at a third stage.

Alternatively, in a DC/DC conversion module in the transmit end provided in this embodiment of this application, a buck circuit may be disposed at a first stage, a boost circuit may be disposed at a second stage, and a buck circuit may be disposed at a third stage. Alternatively, a boost circuit may be disposed at a first stage, a buck circuit may be disposed at a second stage, and a boost circuit may be disposed at a third stage. This is not limited in this embodiment of this application. However, a circuit for high-ratio voltage conversion is implemented by using an open-loop SC circuit.

Based on the transmit end supporting multi-device wireless charging in the foregoing embodiments, an embodiment of this application further provides a charging base for wireless charging. Detailed description is provided below with reference to accompanying drawings.

Figure 19:
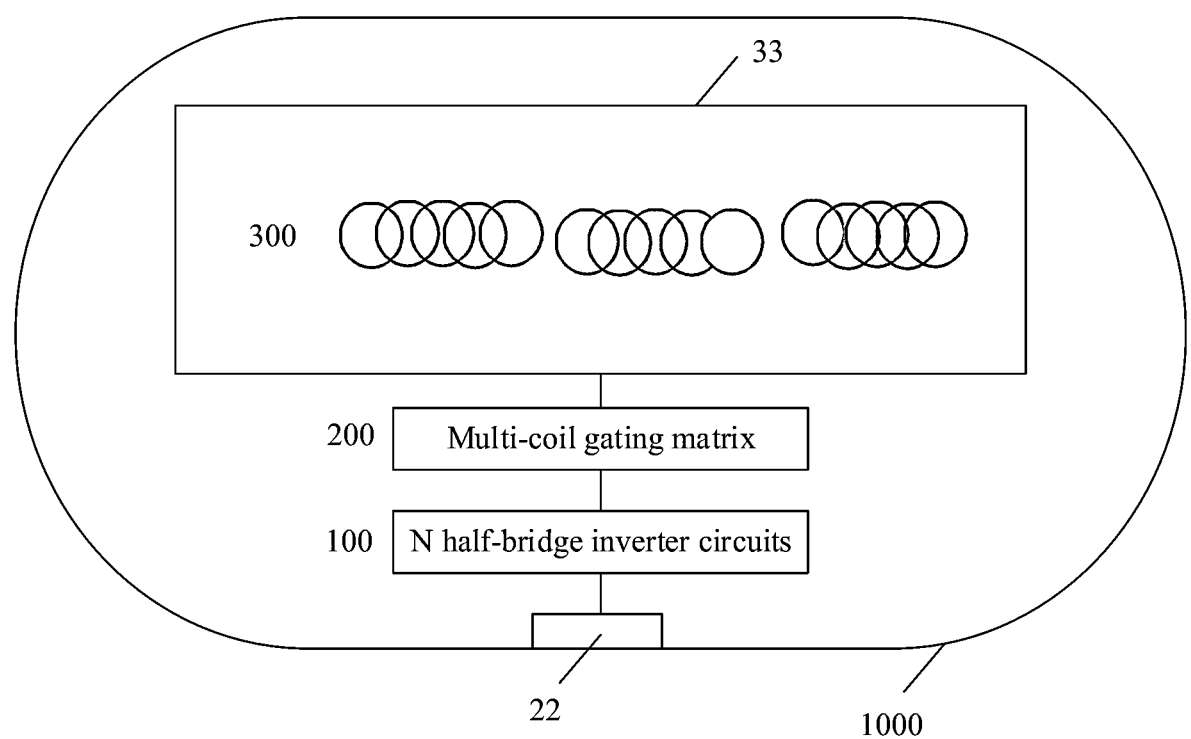
FIG. 19 is a schematic diagram of a charging base according to an embodiment of this application.

FIG. 19 is a schematic diagram of a charging base according to an embodiment of this application.

The charging base 1000 provided in this embodiment is configured to support wireless charging for N electronic devices, where N is an integer greater than or equal to 2, and includes a power interface 22, N half-bridge inverter circuits 100, a multi-coil gating matrix 200, a multi-coil module 300, and a transmit coil tray 33.

The power interface 22 is configured to connect to a power output terminal of an adapter.

The transmit coil tray 33 is configured to hold the multi-coil module 300.

Input terminals of the N half-bridge inverter circuits 100 are connected to corresponding direct currents, and output terminals of the N half-bridge inverter circuits 100 are connected to input terminals of the multi-coil gating matrix 200.

The multi-coil gating matrix 200 includes a plurality of switching switches, configured to respectively connect the output terminals of the N half-bridge inverter circuits 100 to corresponding transmit coils in the multi-coil module 300.

A mobile terminal is a charged electronic device.

The charging base provided in this embodiment of this application can simultaneously charge a plurality of electronic devices, namely, a plurality of mobile terminals, for example, simultaneously charge a mobile phone, a watch, and a Bluetooth headset. An inverter circuit in the charging base uses a half-bridge topology. Compared with a full-bridge inverter circuit, in the half-bridge inverter circuit, a quantity of bridge arms is reduced by 1, and a quantity of switching transistors may be reduced by half. In addition, when the half-bridge inverter circuit is used, a quantity of switching transistors in a next-stage gating matrix may also be reduced by half correspondingly. Therefore, compared with the conventional technology, a quantity of switching transistors in the charging base provided in this embodiment of this application can be reduced by half. When the quantity of switching transistors is reduced, a quantity of corresponding control signals is also reduced. Therefore, both hardware control and software control are simplified. In the charging base, a quantity of internal hardware can be reduced, thereby reducing a size of a circuit board, and reducing costs. In addition, because the quantity of switching transistors is reduced, the quantity of control signals is reduced, thereby improving control reliability.

In an implementation, the charging base further includes a DC/DC conversion module.

The direct current/direct current DC/DC conversion module is configured to convert an output voltage of the adapter and then output N direct currents. The DC/DC conversion module includes at least an open-loop DC/DC circuit.

The input terminals of the N half-bridge inverter circuits are respectively connected to the N direct currents.

When the DC/DC conversion module includes two stages of voltage conversion circuits, the DC/DC conversion module includes an SC boost circuit and N buck circuits. An input terminal of the SC boost circuit is connected to the output terminal of the adapter. Input terminals of the N buck circuits are all connected to an output terminal of the SC boost circuit. An output terminal of each buck circuit is connected to an input terminal of a corresponding half-bridge inverter circuit. The SC boost circuit operates in a boost state or a straight-through state, and the buck circuit operates in a buck state or a straight-through state.

When the DC/DC conversion module includes three stages of voltage conversion circuit, the DC/DC conversion module includes a boost circuit, an SC boost circuit, and N buck circuits. An input terminal of the boost circuit is connected to the output terminal of the adapter. An input terminal of the SC boost circuit is connected to an output terminal of the boost circuit. Input terminals of the N buck circuits are all connected to an output terminal of the SC boost circuit. An output terminal of each buck circuit is connected to an input terminal of a corresponding half-bridge inverter circuit. The boost circuit operates in a boost state or a straight-through state, the SC boost circuit operates in a boost state or a straight-through state, and the buck circuit operates in a buck state or a straight-through state.

An embodiment of this application further provides a wireless charging system, including the transmit end described in any one of the foregoing embodiments, and further including at least one electronic device. The transmit end can simultaneously charge at least two electronic devices.

The transmit end included in the wireless charging system has a simple structure, and can implement a continuous and non-partitioned charging plane. Therefore, a user can flexibly place an electronic device, thereby really improving flexibility of wireless charging. In addition, the transmit end has a simple structure, high charging efficiency, and ease of implementation, so that overall costs of the wireless charging system can be reduced.

It should be understood that, in this application, "at least one (item)" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following" or a similar expression thereof indicates any combination of the items, including any combination of one or more of the items. For example, at least one of a, b, or c may indicate a, b, c, a and b, a and c, b and c, or a, b, and c, where a, b, and c may be singular or plural.

In conclusion, the foregoing embodiments are merely intended for describing technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. An apparatus for wireless charging, comprising:
    a direct current/direct current conversion module configured to convert an output voltage of an adapter to N direct currents, N being an integer equal to or larger than 2;
    N half-bridge inverter circuits;
    a multi-coil gating matrix; and
    a multi-coil module,
    wherein the direct current/direct current conversion module comprises an open-loop direct current/direct current circuit and N first closed-loop direct current/direct current circuits, an input terminal of the open-loop direct current/direct current circuit is connected to an output terminal of the adapter to receive the output voltage, N output terminals of the open-loop direct current/direct current circuit are connected to respective input terminals of the N first closed-loop direct current/direct current circuits;
    wherein N input terminals of the N half-bridge inverter circuits are respectively connected to the N output terminals of the N first closed-loop direct current/direct current circuits to receive the N direct currents, and output terminals of the N half-bridge inverter circuits are connected to input terminals of the multi-coil gating matrix, and
    wherein the multi-coil gating matrix comprises a plurality of switching switches configured to respectively connect the output terminals of the N half-bridge inverter circuits to corresponding transmit coils in the multi-coil module.

2. The apparatus according to claim 1, wherein the open-loop direct current/direct current circuit is an open-loop buck circuit or an open-loop boost circuit, each of the N first closed-loop direct current/direct current circuit is a first closed-loop boost circuit or a first closed-loop buck circuit.

3. The apparatus according to claim 2, wherein the open-loop direct current/direct current circuit comprises a switched-capacitor circuit, and the first closed-loop buck circuit comprises a buck circuit.

4. The apparatus according to claim 3, further comprising a controller configured to:
    when the output voltage of the adapter is less than a preset voltage, control the switched-capacitor circuit to operate in a boost state, and
    control the buck circuit to operate in a buck state.

5. The apparatus according to claim 4, wherein the controller is further configured to:
    when the output voltage of the adapter is adjustable by level, control the switched-capacitor circuit to operate in a straight-through state, and
    control the buck circuit to operate in a buck state.

6. The apparatus according to claim 4, wherein the controller is further configured to:
    when the output voltage of the adapter is continuously adjustable, control the switched-capacitor circuit to operate in a straight-through state, and
    control the buck circuit to operate in a straight-through state.

7. The apparatus according to claim 1, wherein each of the N half-bridge inverter circuits comprises a bridge arm, and the bridge arm comprises two controllable switching transistors connected in series.

8. The apparatus according to claim 7, wherein the two controllable switching transistors connected in series are a first switching transistor and a second switching transistor,
- a first terminal of the first switching transistor is connected to a positive electrode of the direct current, a second terminal of the first switching transistor is connected to a first terminal of the second switching transistor, and a second terminal of the second switching transistor is connected to a negative electrode of the direct current; and
- the second terminal of the first switching transistor serves as an output terminal of the half-bridge inverter circuit and is connected to the input terminal of the multi-coil gating matrix.

* * * * *